(12) United States Patent
Papakonstantinou et al.

(10) Patent No.: US 7,698,267 B2
(45) Date of Patent: Apr. 13, 2010

(54) SEARCHING DIGITAL INFORMATION AND DATABASES

(75) Inventors: Yannis Papakonstantinou, La Jolla, CA (US); Andrey Balmin, San Jose, CA (US); Evangelos Christidis, North Bay Village, FL (US)

(73) Assignee: The Regents of the University of California, Oakland, CA (US)

( * ) Notice: Subject to any disclaimer, the term of this patent is extended or adjusted under 35 U.S.C. 154(b) by 725 days.

(21) Appl. No.: 11/215,346

(22) Filed: Aug. 29, 2005

(65) Prior Publication Data

US 2007/0192306 A1 Aug. 16, 2007

Related U.S. Application Data

(60) Provisional application No. 60/605,217, filed on Aug. 27, 2004.

(51) Int. Cl.
*G06F 7/00* (2006.01)
(52) U.S. Cl. .................. 707/5; 707/1; 707/2; 707/6
(58) Field of Classification Search .............. 707/1, 707/2, 5, 6
See application file for complete search history.

(56) References Cited

U.S. PATENT DOCUMENTS

| | | | | |
|---|---|---|---|---|
| 6,112,203 | A * | 8/2000 | Bharat et al. ............ | 707/5 |
| 6,285,999 | B1 * | 9/2001 | Page ..................... | 707/5 |
| 6,738,759 | B1 * | 5/2004 | Wheeler et al. .......... | 707/3 |
| 7,076,483 | B2 * | 7/2006 | Preda et al. ............ | 707/5 |
| 2003/0050909 | A1 * | 3/2003 | Preda et al. ............ | 707/1 |
| 2004/0254909 | A1 * | 12/2004 | Testa .................... | 707/1 |
| 2005/0027681 | A1 * | 2/2005 | Bernstein et al. ........ | 707/1 |
| 2005/0152289 | A1 * | 7/2005 | Nagata et al. ........... | 370/256 |
| 2005/0256860 | A1 * | 11/2005 | Eiron et al. ............ | 707/4 |
| 2006/0036598 | A1 * | 2/2006 | Wu ....................... | 707/5 |
| 2007/0008884 | A1 * | 1/2007 | Tang ..................... | 370/230 |

OTHER PUBLICATIONS

S.Y.Han and Y.H. Kim, State minimisation-based loop handling for Critical path analysis, Apr. 1, 1996, vol. 32, pp. 8-9.*
S. Agrawal et al., "DBXplorer: A System for Keyword-Based Search Over Relational Databases", *ICDE*, 2002.

(Continued)

*Primary Examiner*—Apu M Mofiz
(74) *Attorney, Agent, or Firm*—Fish & Richardson P.C.

(57) ABSTRACT

This application describes methods for searching digital information such as digital documents (e.g., web pages) and computer databases, and specific search techniques such as authority ranking and information retrieval (IR) relevance ranking in keyword searches. In some implementations, the technique includes analyzing digital information viewed as a labeled graph, including nodes and edges, based on a flow of authority among the nodes along the edges, the flow of authority being derived at least in part from different authority transfer rates assigned to the edges based on edge type schema information. In some implementations, the system includes an object rank module configured to generate multiple initial rankings corresponding to multiple query keywords, each of the multiple initial rankings indicating authority of nodes in a graph with respect to each respective query keyword individually; and a query module configured to combine the multiple initial rankings in response to a query.

3 Claims, 11 Drawing Sheets

OTHER PUBLICATIONS

G. Bhalotia et al., "Keyword Searching and Browsing in Databases Using BANKS," *ICDE*, 2002.

K. Bharat et al., "Improved Algorithms for Topic Distillation in a Hyperlinked Environment," *SIGIR*, 1998.

S. Brin et al., "The Anatomy of a Large-Scale Hypertextual Web Search Engine," *WWW Conference*, 1998.

N. Bruno et al., "Evaluating Top-*k* Queries Over Web-Accessing Databases," *ICDE*, 2002.

A. Burns, "Preemptive Priority Based Scheduling: An Appropriate Engineering Approach," *Advances in Real Time Systems*, S. H. Son, Prentice Hall, 1994, p. 225-248.

S. Chakrabarti et al., "Automatic Resource Compilation by Analyzing Hyperlink Structure and Associated Text," *WWW Conference*, 1998.

Y. Chen et al., "I/O-efficient Techniques for Computing PageRank," *CIKM*, 2002.

R. Fagin et al., "Optimal Aggregation Algorithms for Middleware," *ACM PODS*, 2001.

D. Florescu et al, Integrating Keyword Search into XML Query Processing. *WWW9*, 2000.

R. Goldman et al, "Proximity Search in Databases," *VLDB*, 1998.

X. Gu et al., "An XML-based Quality of Service Enabling Language for the Web," *Journal of Visual Languages and Computing 13*(1), pp. 61-95, 2002.

L. Guo et al, "XRANK: Ranked Keyword Search Over XML Documents," *ACM SIGMOD*, 2003.

T. Haveliwala, "Efficient Computation of PageRank," *Technical Report, Stanford University* (http://www.stanford.edu/taherh/papers/efficient-pr.pdf), 1999.

T. Haveliwala, "Topic-Sensitive PagePank," *WWW Conference*, 2002.

V. Hristidis et al., "Discover: Keyword Search in Relational Databases," *VLDB*, 2002.

V. Hristidis et al., "Keyword Proximity Search on XML Graphs," *ICDE*, 2003.

V. Hristidis et al., "Prefer: A system of the Efficient Execution of Multi-Parametric Ranked Queries," *ACM SIGMOD*, 2001.

A. Huang et al., "TupleRank and Implicit Relationship Discovery in Relational Databases," WAIM, 2003.

G. Jeh et al., "Scaling Personalized Web Search," *WWW Conference*, 2003.

S. Kamvar et al., "Extrapolation Methods for Accelerating PageRank Computations," WWW Conference, 2003.

J. M. Kleinberg, "Authoritative Sources in a Hyperlinked Environment," *Journal of the ACM* 46, 1999.

R. Motwani et al, "Randomized Algorithm," *Cambridge University Press*, United Kingdom, 1995.

A. Natsev et al, "Supporting Incremental Join Queries on Ranked Inputs," *VLDB*, 2001.

M. Ortega et al, "Supporting Ranked Boolean Similarity Queries in MARS," *TKDE*, 10(6), pp. 905-925, 1998.

J. Plesnik, "A Bound for the Steiner Tree Problem in Graphs," *Math. Slovaca*, 31, pp. 155-163, 1981.

M. Richardson et al, "The Intelligent Surfer: Probabilistic Combination of Link and Content Information in PageRank," *Advances in Neural Information Processing Systems 14*, MIT Press, 2002.

J. Savoy, "Bayesian Inference Networks and Spreading Activation in Hypertext Systems," *Information Processing and Management*, 28(3): pp. 389-406, 1992.

A. Singhal, "Modern Information Retrieval: A Brief Overview," *IEEE Data Engineering Bulletin, Special Issue on Text and Databases*, 24(4), Dec. 2001.

T. Cormen et al., "Introduction to Algorithms," /MIT Press/, 1989. Chapter 23.4 on Topological Sorting.

G. H. Golub et al., "Matrix Computations," /Johns Hopkins/, 1996. Chapter 3: General Linear Systems.

\* cited by examiner

300

| | |
|---|---|
| 41.34 | Data Cube: A Relational Aggregation Operator Generalizing Group-By, Cross-Tab, and Sub-Total. Jim Gray, ICDE 1996 |
| 36.62 | Index Selection for OLAP. Himanshu Gupta, ICDE 1997 |
| 35.11 | Range Queries in OLAP Data Cubes. Ching-Tien Ho, SIGMOD 1997 |
| 31.03 | Discovery-Driven Exploration of OLAP Data Cubes. Sunita Sarawagi, EDBT 1998 |
| 30.7 | OLAP and Statistical Databases: Similarities and Differences. Arie Shoshani, PODS 1997 |
| 30.23 | Implementing Data Cubes Efficiently. Venky Harinarayan, SIGMOD 1996 |
| 29.42 | Relative Prefix Sums: An Efficient Approach for Querying Dynamic OLAP Data Cubes. Steven Geffner, ICDE 1999 |
| 28.49 | Modeling Multidimensional Databases. Rakesh Agrawal, ICDE 1997 |
| 26.96 | Summarizability in OLAP and Statistical Data Bases. Hans-J. Lenz, SSDBM 1997 |
| 26.75 | Data Warehousing and OLAP for Decision Support (Tutorial). Surajit Chaudhuri, SIGMOD 1997 |

FIG. 3

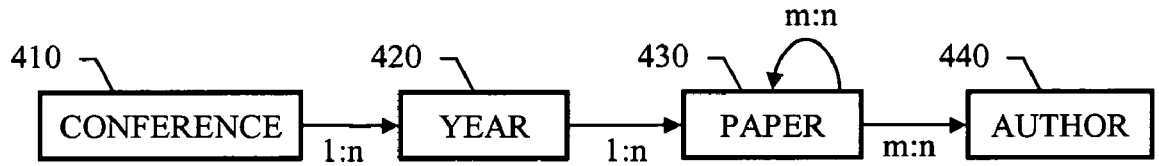

FIG. 4

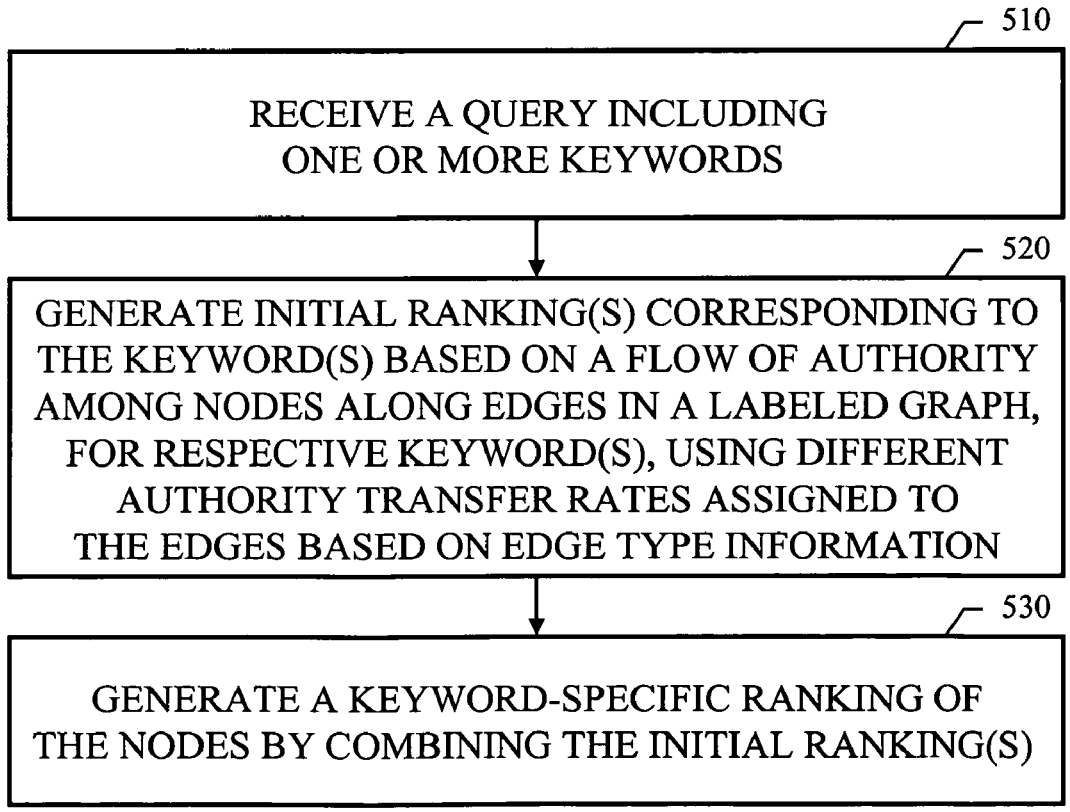

FIG. 5

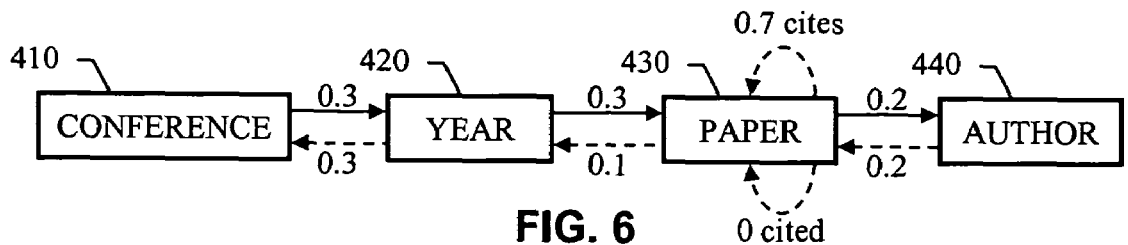

FIG. 6

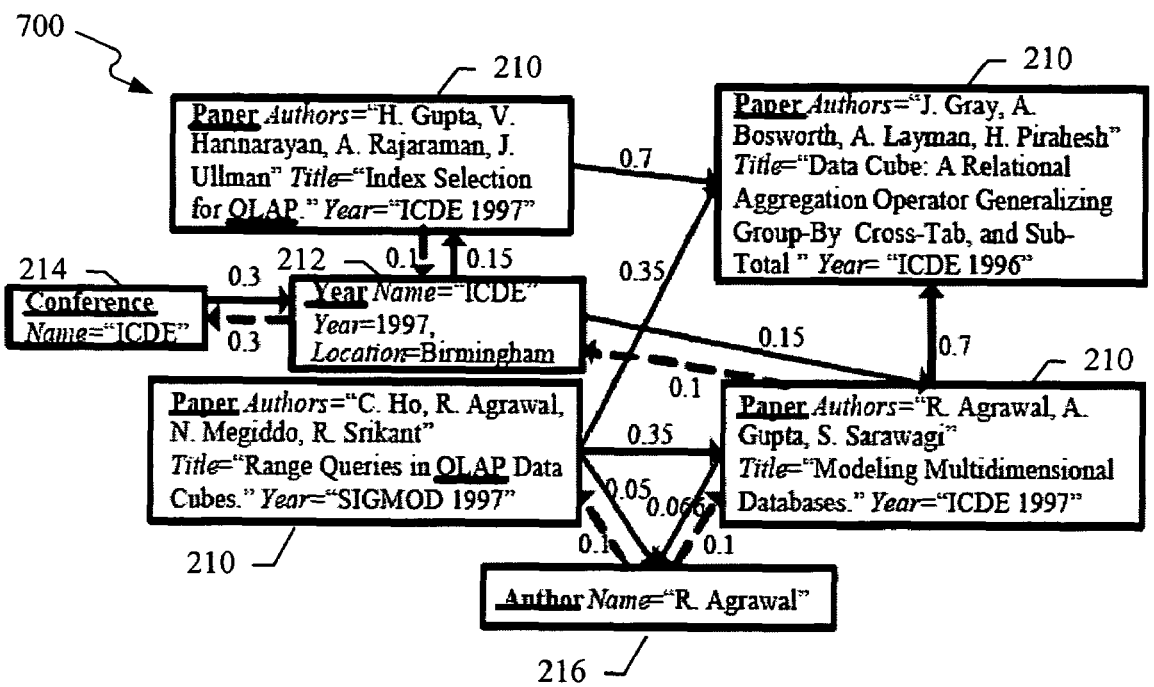

(a)
| | | |
|---|---|---|
| 47.31 | 11.44 | An XML Indexing Structure with Relative Region Coordinate. Dao Dinh Kha, ICDE 2001 |
| 41.02 | 3.08 | DataGuides: Enabling Query ... Optimization in Semistructured... Roy Goldman, VLDB 1997 |
| 7.44 | 28.43 | Access Path Selection in a RDBMS. Patricia G. Selinger, SIGMOD 1979 |
| 31.44 | 3.24 | Querying Object-Oriented Databases Michael Kifer, SIGMOD 1992 |
| 26.73 | 3.09 | A Query ... Optimization Techniques for Unstructured Data. Peter Buneman, SIGMOD 1996 |

(b)
| | | |
|---|---|---|
| 47.31 | 11.44 | An XML Indexing Structure with Relative Region Coordinate. Dao Dinh Kha, ICDE 2001 |
| 7.44 | 28.43 | Access Path Selection in a RDBMS. Patricia G. Selinger, SIGMOD 1979 |
| 2.04 | 102.1 | R-Trees: A Dynamic Index Structure for Spatial Searching. Antonin Guttman, SIGMOD 1984 |
| 1.73 | 112.7 | The K-D-B-Tree A Search Structure For Large ... Indexes. John T. Robinson, SIGMOD 1981 |
| 41.02 | 3.08 | DataGuides: Enabling Query ... Optimization in Semistructured... Roy Goldman, VLDB 1997 |

FIG. 8

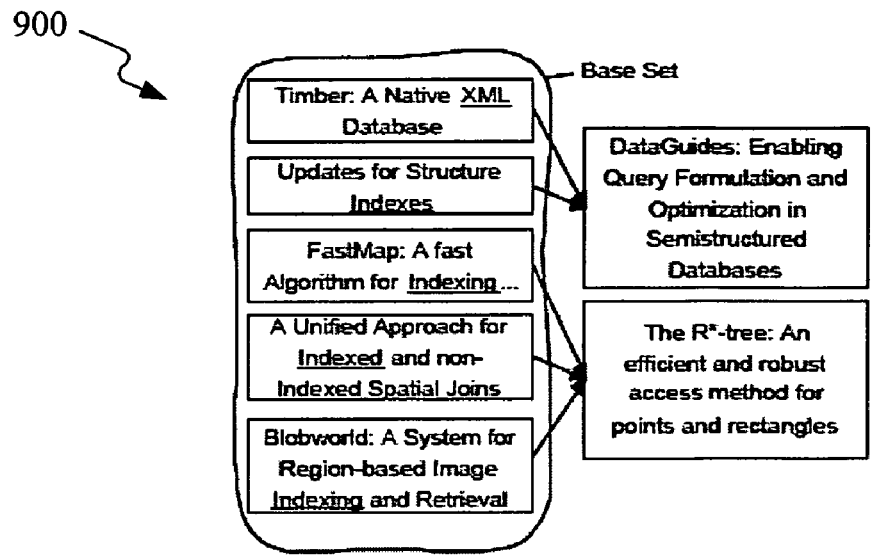

FIG. 9

```
CreateIndex(keywordsList, epsilon, threshold, α(.), d){
01. For each keyword w in keywordsList do {
02.   While not converged do
03.   /*i.e., ∃v, |r^(k+1)(v) − r^(k)(v)| > epsilon*/
04.     MakeOnePass(w,α(.), d);
05.     StoreObjectRanks();
06. }
}
MakeOnePass(w,α(.), d) {
07. Evaluate Equation 6 using the r from
    the previous iteration on the right side;
}
StoreObjectRanks() {
08. Sort the ⟨id(i), r(v_i)⟩ pairs list by r(v_i) and
    store it in inverted index, after removing pairs with
    r(v_i) < threshold;
}
```

```
CreateIndexDAG(keywordsList, threshold, α(.), d){
01. Topologically sort nodes in graph $D^A$;
02. /*Consecutive accesses to $D'^A$ are in topological order.*/
03. For each keyword $w$ in keywordsList do {
04.   MakeOnePass($w,α(.), d$);
05.   StoreObjectRanks();
06. }
}
```

```
CreateIndexAlmostDAG(keywordsList, threshold, α(.), d){
01. c: vector of ObjectRanks of backnodes;
02. Identify backnodes and topologically sort
    the DAG ($D^A$ without the backedges) $D'^A$;
03. /*Consecutive accesses to $D'^A$ are in topological order.*/
04. /*Backedges are considered in $D'^A$ for α(.) .*/
05. C=BuildCoefficientsTable();
06. For each keyword $w$ in keywordsList do {
07.   Calculate ObjectRanks vector $r'$ for $D'^A$ executing
        MakeOnePass($w,α(.), d$);
08.   Solve $c = \overline{C} \cdot c + \overline{r'}$;
09.   /*$\overline{D}$ denotes keeping only the lines of D
        corresponding to backnodes.*/
10.   $r = C \cdot c + r'$
11.   StoreObjectRanks();
12. }
}
BuildCoefficientsTable(){
13. For each node $v_j$ do
14.   $r(v_j) = d \cdot \sum_{backnode\ c_i\ points\ at\ v_j} (α(c_i \to v_j) \cdot c_i) +$
       $d \cdot \sum_{non-backnode\ v_l\ points\ at\ v_j} (α(v_l \to v_j) \cdot r(v_l))$;
15. Return C, such that $r = C \cdot c$
}
```

FIG. 12

FIG. 17

| Complaints 1810 | | | | |
|---|---|---|---|---|
| tupleId | prodId | custId | date | comments |
| $c_1$ | p121 | c3232 | 6-30-2002 | "disk crashed after just one week of moderate use on an IBM Netvista X41" |
| $c_2$ | p131 | c3131 | 7-3-2002 | "lower-end IBM Netvista caught fire, starting apparently with disk" |
| $c_3$ | p131 | c3143 | 8-3-2002 | "IBM Netvista unstable with Maxtor HD" |

FIG. 18A

| Products 1820 | | | |
|---|---|---|---|
| tupleId | prodId | manufacturer | model |
| $p_1$ | p121 | "Maxtor" | "D540X" |
| $p_2$ | p131 | "IBM" | "Netvista" |
| $p_3$ | p141 | "Tripplite" | "Smart 700VA" |

FIG. 18B

| Customers 1830 | | | |
|---|---|---|---|
| tupleId | custId | name | occupation |
| $u_1$ | c3232 | "John Smith" | "Software Engineer" |
| $u_2$ | c3131 | "Jack Lucas" | "Architect" |
| $u_3$ | c3143 | "John Mayer" | "Student" |

FIG. 18C

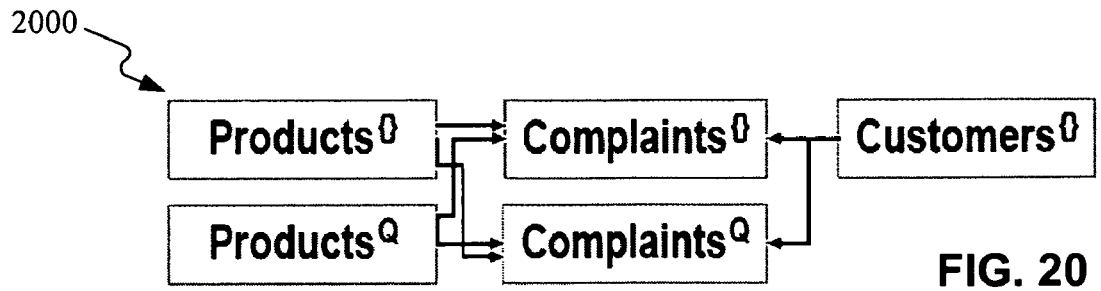
FIG. 20
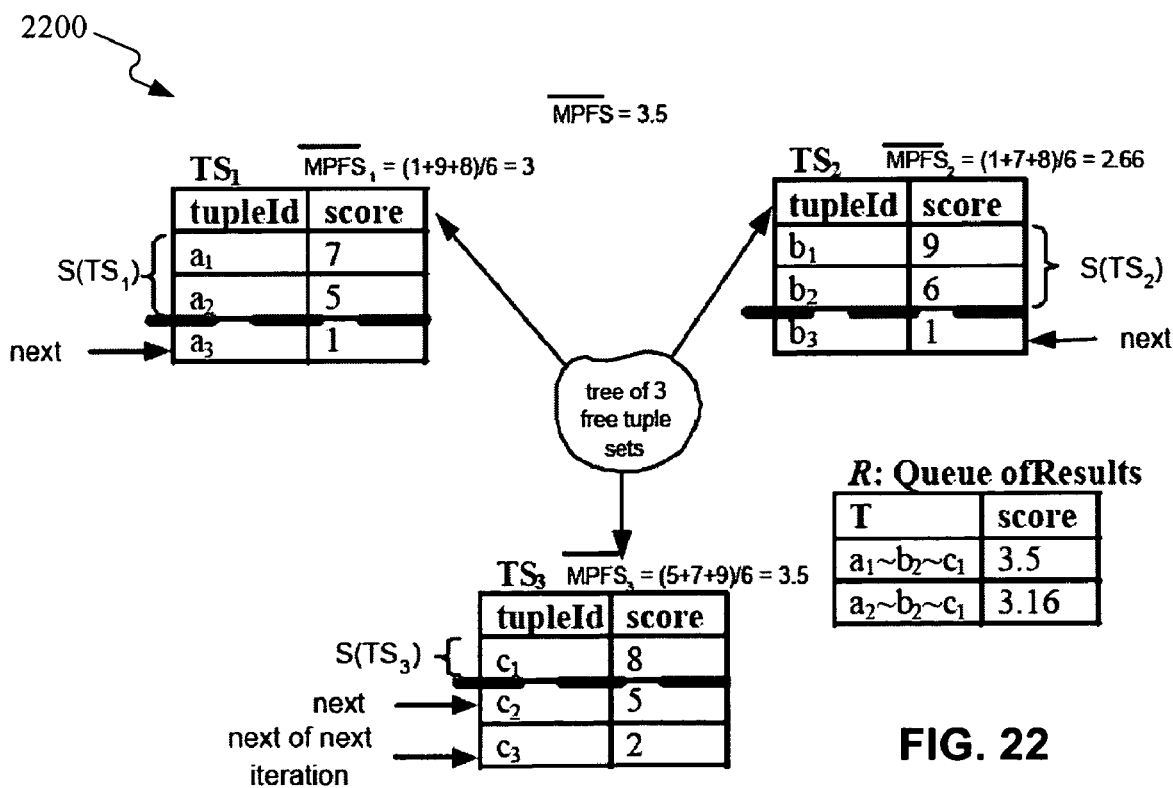
FIG. 21
FIG. 22

2300

```
Single Pipelined Algorithm(C, Q, k, Score(.), TS_1, ..., TS_v){
01. h(TS_i): top unprocessed tuple of TS_i
        (i.e., not yet added to S(TS_i))
02. S(TS_i): prefix of TS_i retrieved so far; initially empty
03. R: queue for not-yet-output results, by descending Score(T, Q)
04. Execute parameterized query q(h(TS_1), ..., h(TS_v))
05. Add results of q to R
06. Output all results T in R with Score(T, Q) ≥ max_{i=1}^{v} \overline{MPFS_i}
07. For i = 1, ..., v move h(TS_i) to S(TS_i)
08. While (fewer than k results have been output) do {
09.    Get tuple t = h(TS_M), where \overline{MPFS_M} = max_{i=1}^{v} \overline{MPFS_i}
10.    Move t to S(TS_M)
11.    For each combination (t_1, ..., t_{M-1}, t_{M+1}, ..., t_v) of tuples
           where t_i ∈ S(TS_i) do {
12.       Execute parameterized query q(t_1, ..., t_{M-1}, t, t_{M+1}, ..., t_v)
13.       Add results of q to R}
14.    Output all new results T in R with
           Score(T, Q) ≥ max_{i=1}^{v} \overline{MPFS_i}}}
```

```
Global Pipelined Algorithm(C_1, ..., C_n, k, Q, Score(.)){
01. Let v_i be the number of non-free tuple sets of CN C_i
02. h(TS_{i,j}): top unprocessed tuple of C_i's j-th tuple set TS_{i,j}
03. S(TS_{i,j}): prefix of TS_{i,j} retrieved so far; initially empty
04. R: queue for not-yet-output results, by descending Score(T, Q)
05. For i = 1 ... n do {
06.    Execute parameterized query q_i(h(TS_{i,1}), ..., h(TS_{i,v_i}))
07.    /* q_i is the parameterized query for CN C_i */
08.    Add results of q_i to R
09.    For j = 1, ..., v_i move h(TS_{i,j}) to S(TS_{i,j})}
10. Output all results T in R with Score(T, Q) ≥ GMPFS
11. While (fewer than k results have been output) do {
12.    /* Get tuple from most promising tuple set of most promising CN */
13.    Get tuple t = h(TS_{c,M}), where \overline{MPFS_M} for CN C_c is highest
14.    Move t to S(TS_{c,M})
15.    For each combination (t_1, ..., t_{M-1}, t_{M+1}, ..., t_{v_c}) of tuples
           where t_l ∈ S(TS_{c,l}) do{
16.       Execute parameterized query q_c(t_1, ..., t_{M-1}, t, t_{M+1}, ..., t_{v_c})
17.       Add results of q_c to R}
18.    Output all new results T in R with Score(T, Q) ≥ GMPFS}}
```

FIG. 24

```
Hybrid Algorithm(C_1, ..., C_n, k, c, Q, Score(.)){
01. c is a tuning constant
02. Estimate = GetEstimate(C_1, ..., C_n)
03. If Estimate > c · k then execute Global Pipelined
04. else execute Sparse}
```

SEARCHING DIGITAL INFORMATION AND DATABASES

CROSS REFERENCE TO RELATED APPLICATIONS

This application claims the benefit of the priority of U.S. Provisional Application Ser. No. 60/605,217, filed Aug. 27, 2004 and entitled "Methods for Searching Digital Documents and Databases", which is hereby incorporated by reference.

STATEMENT AS TO FEDERALLY SPONSORED RESEARCH

This invention was made with Government support under NSF Grant No. IIS-9734548 awarded by the National Science Foundation. The Government has certain rights in the invention.

BACKGROUND

This application relates to methods for searching digital information such as computer databases and digital documents.

Digital information is widely used in various applications that use computers or microprocessors. Examples of digital information include computer files, computer databases, web pages, and electronic mails. One of many advantageous features of digital information is that digital information by nature is searchable by using computer search software tools based on various algorithms. However, one notable challenge in such computer search is to provide a thorough, relevant search without distracting a user with irrelevant information. Various web search engines are specific examples of such computer search software tools that are designed to search web pages published on web sites on the World Wide Web.

SUMMARY

The present disclosure includes systems and techniques relating to searching digital information and databases. According to an aspect of the described systems and techniques, authority flow-based search can be performed by incorporating database schema-driven edge weights. A method can include analyzing digital information viewed as a labeled graph, including nodes and edges, based on a flow of authority among the nodes along the edges, the flow of authority being derived at least in part from different authority transfer rates assigned to the edges based on edge type schema information; and generating a keyword-specific ranking of the nodes in response to a query, including at least one keyword, based on a result of the analysis. The method can further include receiving the query, the query including multiple keywords; wherein analyzing the digital information includes generating multiple initial rankings corresponding to the multiple keywords, each of the multiple initial rankings indicating authority of the nodes with respect to each respective keyword; and wherein the generating the keyword-specific ranking includes combining the multiple initial rankings.

Generating each of the multiple initial rankings can include performing a random-surfer-type authority-based search of the digital information using a base set consisting essentially of the nodes that contain a keyword of the query corresponding to each respective initial ranking being generated. The analyzing can include generating global node rank information; and generating keyword-specific node rank information using the global node rank information as initial values for iterative processing, the keyword-specific node rank information being generated before receipt of the query.

Combining the multiple initial rankings can include combining based on user definable adjusting parameters that influence a normalization scheme, which differentiates between the multiple keywords, and a global-to-keyword weighting scheme, which differentiates between global node rank information and keyword-specific node rank information. Generating the multiple initial rankings can include topologically sorting the labeled graph. Moreover, generating the multiple initial rankings can further include identifying and removing cycles in the labeled graph to reduce the labeled graph into a directed acyclic graph (DAG) and a set of backward edges before doing keyword-specific calculation of the multiple initial rankings; identifying a set of backnodes, which are nodes of the labeled graph from which the backward edges start; and calculating node rank information in a bifurcated fashion such that calculation of the node rank information is split between (1) calculating DAG node rank information while ignoring the backward edges and (2) calculating backedges node rank information, due to the backward edges, using the identified backnodes.

The digital information can include a database having a structural relationship among the nodes defined by semantic contents of the database, and the generating the multiple initial rankings can include optimizing calculation of the multiple initial rankings based on the structural relationship among the nodes. Moreover, the generating the multiple initial rankings can include setting initial conditions for iterative processing based on the semantic contents and stored values for a subset of the nodes in the database.

The analyzing can include analyzing the digital information based on user definable calibrating parameters including the authority transfer rates assigned to the edges. In addition, the method can include modeling a database system as the labeled graph, wherein the analyzing includes searching the database system.

A system can include an object rank module configured to generate multiple initial rankings corresponding to multiple query keywords, each of the multiple initial rankings indicating authority of nodes in a graph with respect to each respective query keyword individually; and a query module configured to combine the multiple initial rankings in response to a query. The object rank module can be configured to generate the multiple initial rankings based on an analysis of a flow of authority among the nodes along edges in the graph, the flow of authority being derived at least in part from different authority transfer rates assigned to the edges based on edge type schema information of the graph.

The object rank module can be configured to generate the multiple initial rankings by performing a random-surfer-type authority-based search using a base set consisting essentially of the nodes that contain a keyword of the query corresponding to each respective initial ranking being generated. The analysis can generate keyword-specific node rank information using previously generated global node rank information as initial values for iterative processing. The query module can be configured to combine the multiple initial rankings based on user definable adjusting parameters that influence a normalization scheme, which differentiates between the multiple query keywords, and a global-to-keyword weighting scheme, which differentiates between global node rank information and keyword-specific node rank information.

The object rank module can be configured to topologically sort the graph. The object rank module can be configured to identify and remove cycles in the graph to reduce the graph into a directed acyclic graph (DAG) and a set of backward edges before doing keyword-specific calculation of the multiple initial rankings; identify a set of backnodes; and calculate node rank information in a bifurcated fashion such that calculation of the node rank information is split between (1) calculating DAG node rank information while ignoring the backward edges and (2) calculating backedges node rank information, due to the backward edges, using the identified backnodes. The graph can represent a database having a structural relationship among the nodes defined by semantic contents of the database, and the object rank module can be configured to optimize calculation of the multiple initial rankings based on the structural relationship among the nodes. The object rank module can be configured to set initial conditions for iterative processing based on the semantic contents and stored values for a subset of the nodes in the database. Moreover, the analysis can be based on user definable calibrating parameters including the authority transfer rates assigned to the edges.

According to another aspect of the described systems and techniques, efficient information retrieval (IR) style keyword searching can be performed over a database. A method can include receiving a query Q and a corresponding result set of joining trees of tuples T from a database; and ranking the joining trees of the result set based on a combination of relevance scores for attributes $a_i \in$ the tuples T and the query Q with a characteristic of the joining trees of the tuples T, the relevance scores being determined by an information retrieval engine of a database management system.

The method can further include combining the relevance scores for the attributes with size information for the joining trees of the tuples to form the combination. The combining can include combining according to Combine and Score equations, $$\text{Combine}(\text{Score}(A, Q), \text{size}(T)) = \frac{\sum_{a_i \in A} \text{Score}(a_i, Q)}{\text{size}(T)}; \text{ and}$$

$$\text{Score}(a_i, Q) = \sum_{w \in Q \cap a_i} \frac{1 + \ln(1 + \ln(tf))}{(1-s) + s\frac{dl}{avdl}} \cdot \ln\frac{N+1}{df};$$

wherein $A = \langle a_1, \ldots, a_n \rangle$ is a vector with textual attribute values for T, and for a word w, tf is a frequency of w in $a_i$, df is a number of tuples in $a_i$'s relation with word w in an attribute, dl is a size of $a_i$ in characters, avdl is an average attribute-value size, N is a total number of tuples in $a_i$'s relation, and s is a constant.

The ranking can include performing pipelined processing to produce a top-k set of the joining trees of the tuples. The ranking can include prioritizing evaluation of candidate networks based on an overestimate of a maximum-possible-future-score for respective candidate networks, the overestimate being computed from a score of a hypothetical tree of tuples including a next unprocessed tuple $t_i$, from a non-free tuple set $TS_i$, and a top-ranked tuple $t_j^{top}$ of each tuple set $TS_j$, for $j \neq i$.

The ranking can include dynamically pruning some candidate networks during query evaluation based on calculated maximum-possible-score bounds of tuple trees, derived from the candidate networks, and an actual score of k already produced tuple trees. Moreover, the ranking can include evaluating candidate networks for the query in ascending size order.

A system can include a database management system including a database and an information retrieval (IR) engine configured to calculate IR scores of individual attribute values in the database management system; and a query manager in communication with the database management system, the query manager being configured to provide a ranking function that incorporates the IR scores of the individual attribute values and information about a structure of a result-tree from a free-form keyword query over the database.

The query manager can include an execution engine in a processing pipeline including a candidate network generator and the IR engine, wherein the execution engine is configured to repeatedly contact a query engine of the database management system to identify top-k query results. The database can include a relational database, the IR engine can use an IR index to create only a single tuple set $RQ = \{t \in R | \text{Score}(t, Q) > 0\}$ for each relation R, and the query manager can be configured to perform post processing for queries with AND semantics to check and return only tuple trees containing all query words.

The ranking function can be decoupled from details of the IR scores calculation performed by the information retrieval engine. The query manager can be a lightweight middleware, and the database management system can include text-indexing capabilities. In addition, a method for providing information retrieval (IR) relevance ranking in a keyword search can include obtaining IR scores of individual attribute values in response to a keyword search; obtaining a result tree structure from the keyword search; and combining both the IR scores and the result tree structure to produce a relevance ranking in the keyword search.

The described systems and techniques can be implemented in electronic circuitry, computer hardware, firmware, software, or in combinations of them, such as the structural means disclosed in this specification and structural equivalents thereof. This can include a program operable to cause one or more programmable machines including one or more processors (e.g., a database management system) to perform operations described. Thus, program implementations can be realized from a disclosed method, system, or apparatus, and apparatus implementations can be realized from a disclosed system, program, or method. Similarly, method implementations can be realized from a disclosed system, program, or apparatus, and system implementations can be realized from a disclosed method, program, or apparatus.

One or more of the following advantages may be provided. The Object Rank systems and techniques described can provide keyword-specific ranking based on keyword-specific authority-flow, in contrast with various other computer search tools that provide a global ranking of objects regardless of the query's keywords. As an advantage, the present systems and techniques can operate to return results that are highly relevant to the keywords even though they do not contain them. For example, if many On-Line Analytical Processing (OLAP) papers refer to a paper that does not contain the word OLAP, then this paper can still be ranked high for the keyword query of "OLAP" using the present systems and techniques.

Authority-based keyword search can be formalized in databases, where the semantic meaning of each type of edge is of importance to the flow. The Object Rank systems and techniques described can allow the user to guide the assignment of authority bounds on the edges of the schema for a set of digital information, such as a database. These authority transfer bounds can be provided by a domain expert.

Furthermore, the present Object Rank systems and techniques can differentiate between the global importance of an object (such as defined in traditional PageRank techniques)

and the relevance of the object to a keyword query. In some implementations, the user can weight these factors in order to get the desired result. On a performance level, the Object Rank systems and techniques can include a precomputation stage and an execution stage. During precomputation, an inverted index can be generated, which stores for every keyword "w" a list of object identifiers (ids) ranked according to their ranking values with respect to "w". Moreover, the systems and techniques used to generate these lists can exploit the existence of a schema or other information about the structure of the data graph at hand. For example, in the execution stage, the TA algorithm (described in R. Fagin, A. Lotem, and M. Naor; Optimal Aggregation Algorithms for Middleware; ACM PODS, 2001) can be applied to efficiently combine the keyword-specific lists to produce the top results for a multi-keyword query.

The described Object Rank systems and techniques can be used to provide high quality keyword search in computer document collections and databases such as enterprise databases (e.g., a database in a commercial database management system). As an example, in a database storing complaints of customers about products, the Object Rank systems and techniques may be used to rank higher complaints that are associated, either directly or through a semantic path in the database, to important customers. Also, the Object Rank systems and techniques described can be applied to digital libraries, where a user can readily discover the most relevant and important papers or books for a specific topic.

In addition, free-form keyword search over relational database management systems (RDBMSs) has attracted recent research interest. Given a keyword query, systems such as DBXplorer and DISCOVER join tuples from multiple relations in the database to identify tuple trees with all the query keywords ("AND" semantics). All such tuple trees are the answer to the query. Also, both DBXplorer and DISCOVER rank the tuple trees solely by the number of joins needed in their creation. The rationale behind this simple relevance-ranking scheme is that the more joins are needed to create a tuple tree with all query keywords, the less clear it becomes whether the result might be meaningful or helpful.

To improve upon these approaches, the present systems and techniques can employ IR-style ranking heuristics that can be highly effective over text. The incorporation of IR-style relevance ranking of tuple trees into a query processing framework can result in significant advantages. The present approach can fully exploit single-attribute relevance-ranking results if the RDBMS of choice has text-indexing capabilities (e.g., as is the case for Oracle 9.1, available from Oracle Corporation of Redwood Shores, Calif., as discussed above). By leveraging state-of-the-art IR relevance-ranking functionality already present in modern RDBMSs, high quality results can be produced for free-form keyword queries. The present scheme can rely on the IR engines of RDBMSs to perform such relevance-ranking at the attribute level, and can handle both AND and OR semantics.

The present query-processing strategy for keyword search over RDBMSs can improve inefficiency by not attempting to capture all tuple trees with all query keywords. Thus, the present strategy can exploit a crucial characteristic of IR-style keyword search, namely that only the top 10 or 20 most relevant matches for a keyword query—according to some definition of "relevance"—are generally of interest. In addition, efficient query processing techniques for IR-style queries over RDBMSs are presented below that heavily exploit this observation. The present systems and techniques can produce the top-k matches for a query—for moderate values of k—in a fraction of the time taken by state-of-the-art strategies to compute all query matches. Furthermore, these techniques can be pipelined, in the sense that execution can efficiently resume to compute the "next-k" matches if the user so desires.

A graph of the database tuples need not be materialized and maintained, and important structural information provided by the database schema can be actively taken into consideration. Structural constraints expressed in the schema can assist in keyword query processing using both AND and OR semantics. All query keywords need not appear in the tree of nodes or tuples that are returned as the answer to a query. Furthermore, ranking techniques developed by the IR community can be employed in ranking answers to queries in addition to the size of the result.

IR-style relevance-ranking functionality, typically over individual text attributes, is often included in modern RDBMSs, such as Oracle 9i Text (available from Oracle Corporation of Redwood Shores, Calif.), IBM DB2 Text Information Extender (available from International Business Machines Corp. of Armonk, N.Y.), and Microsoft SQL Server 2000 (available from Microsoft Corp. of Redmond, Wash.). These systems allow users to create full-text indexes on single attributes to then perform keyword queries. By treating these single-attribute indexing modules as "black boxes", the present query processing system can separate itself from the peculiarities of each attribute domain or application. In effect, the present approach need not require any semantic knowledge about the database, and can cleanly separate the relevance-ranking problem for a specific database attribute, which is performed by appropriate RDBMS modules, from the problem of combining the individual attribute scores and identifying the top joining trees of tuples for a query.

The present processing of top-k can be performed in a pipelined fashion that enables efficient joining of ranked tuples coming from multiple relations in unpredictable ways to produce the final top-k results. The single pipelined process described can take into consideration predicates over "connecting" relations (free tuple sets). Not all incomplete results need to be buffered, which can provide benefits where all combinations of tuples from the non-free tuple sets are candidate results (i.e., may join through the free tuple sets).

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIG. 3 shows an example top-10 "OLAP" papers in the DBLP subset.

FIG. 4 shows an example schema graph.

FIG. 5 shows an example process of analyzing digital information to generate a keyword-specific ranking of nodes based on a query.

FIG. 6 shows the authority transfer schema graph, for the schema graph of FIG. 4, that corresponds to the setting that produced the results of FIG. 3.

FIG. 7 shows an authority transfer data graph that corresponds to FIG. 2.

FIG. 8 shows example results for the query "XML AND Index", with and without emphasis on "XML".

FIG. 9 shows example results of a single-base set approach to analyzing the authority of nodes in a graph.

FIG. 10 shows pseudo code for a process that creates an Object Rank index for the case of arbitrary authority transfer data graphs.

FIG. 11 shows pseudo code for a process that computes Object Rank values in a single pass for directed acyclic graphs.

FIG. 12 shows pseudo code for creating an Object Rank index for graphs that are almost directed acyclic graphs (DAGs).

FIG. 17 shows an example schema graph 1700 for an example Complaints database example.

FIGS. 18A, 18B AND 18C show an example instance of the database of FIG. 17.

FIG. 20 shows an example tuple set graph for the complaints database.

FIG. 21 shows example joining trees of tuples.

FIG. 22 shows a snapshot of an execution of a single pipelined process on a hypothetical database.

FIG. 23 shows pseudo code for a single pipelined approach to calculating the top-k results for a single candidate network in a pipelined fashion.

FIG. 24 shows pseudo code for a global pipelined approach to calculating the top-k results in a pipelined fashion.

Like reference symbols in the various drawings indicate like elements.

DETAILED DESCRIPTION

This application describes methods for searching digital information that may be implemented in various computer search software tools. In some implementations, search techniques based on authority ranking are applied to keyword searches to improve keyword searches. In some additional implementations, search techniques using information retrieval (IR) relevance ranking are applied to keyword searches. The described search techniques may be combined with each other or with other search techniques to form various search tools.

Figure 1:
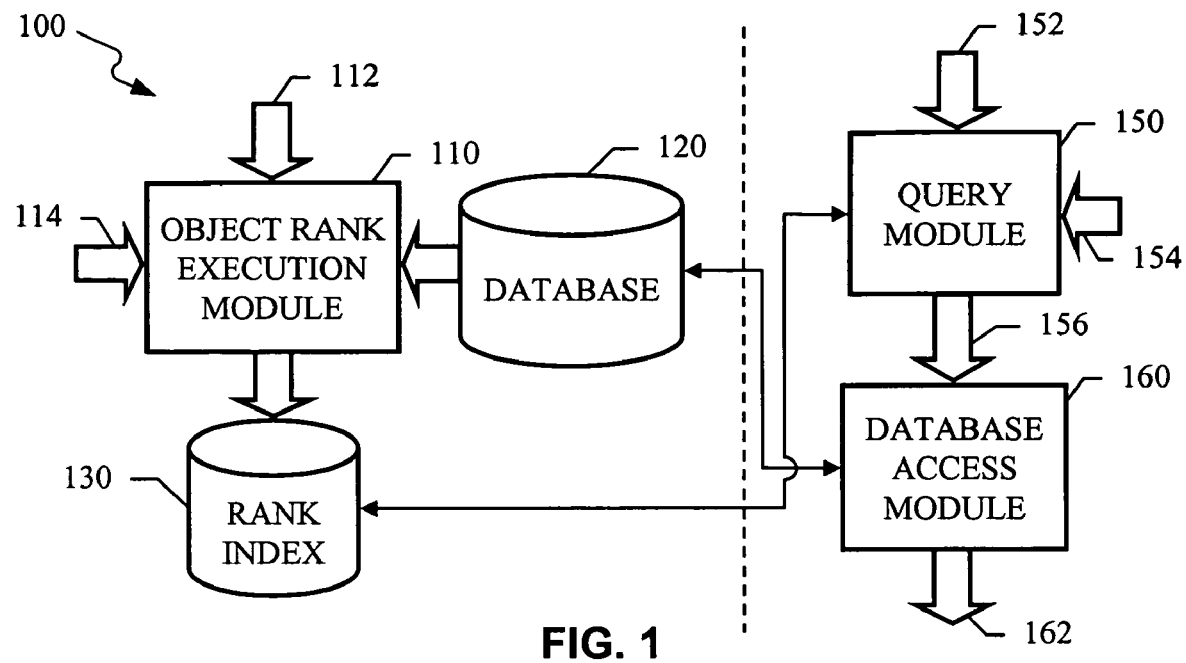
FIG. 1 shows an example architecture of an Object Rank system.

1. Object Rank System: An Exemplary Implementation of Keyword Search Based on Authority Ranking FIG. 1 shows an example architecture of an Object Rank system 100. This represents an exemplary implementation of keyword search based on authority ranking to illustrate various features of the present systems and techniques. In general, an Object Rank system applies authority-based search to keyword search in databases modeled or viewed as labeled graphs (a labeled graph being a graph in which each node has been assigned a name or label). Conceptually, authority originates at the nodes (objects) containing the keywords and flows to objects according to their semantic connections. Each node can be ranked according to its authority with respect to the particular keywords. In various implementation, one can adjust the weight of global importance, the weight of each keyword of the query, the importance of a result actually containing the keywords versus being referenced by nodes containing them, and the volume of authority flow via each type of semantic connection.

Novel performance challenges and opportunities are addressed below in the context of the example Object Rank systems and techniques described. For example, schemas generally impose constraints on the graph, which can be exploited for performance purposes. Moreover, in order to address the issue of authority ranking with respect to the given keywords (as opposed to a global ranking of nodes, which is independent of a keyword query), the single keyword node rankings can be precomputed and combined during run time.

Figure 2:
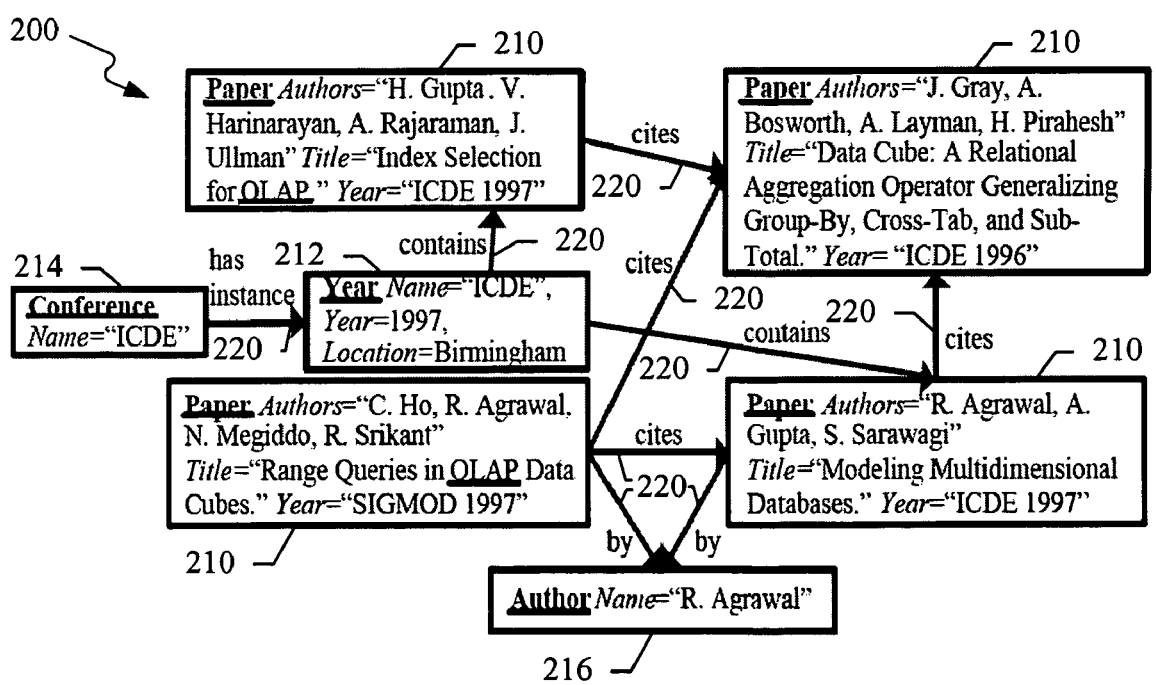
FIG. 2 shows an example small subset of a Digital Bibliography & Library Project (DBLP) database in the form of a labeled graph.

The system 100 can extend and modify traditional node ranking techniques to perform keyword search in databases for which there is a natural flow of authority between their objects (e.g., bibliographic or complaints databases). FIG. 2 shows an example small subset 200 of a Digital Bibliography & Library Project (DBLP) database in the form of a labeled graph. This example DLBLP discussed here includes available publications in twelve major database conferences, including SIGMOD, VLDB, PODS, ICDE, ICDT and EDBT, up to year 2001. In the subset 200 of the labeled graph shown, there are four types of nodes: paper nodes 210, year nodes 212, conference nodes 214 and author nodes 216. In this example, author, conference and year nodes 216, 214 and 212, respectively, are omitted (except for "R. Agrawal", "ICDE" and "ICDE 1997") to simplify the figure. In addition, the various edges 220 are labeled: "has instance", "contains", "cites", and "by" (although note that the edges need not have any actual labels or names in the database, or in any graph model of such database, because the types of edges can be implicitly defined).

FIG. 4 shows an example schema graph. Such scheme graphs describe the structure of database graphs. In this example, the schema graph defines the edge/link relationships between the nodes of FIG. 2. A conference node 410 can link to multiple year nodes 420 (a 1:n relationship). A year node 420 can link to multiple paper nodes 430 (a 1:n relationship). One or more paper nodes 430 can link to one or more other paper nodes 430 (an m:n relationship) and to one or more author nodes 440 (an m:n relationship).

Given a keyword query, e.g. the single key-word query "OLAP", an Object Rank system can sort the database objects by their importance with respect to the user-provided keywords. FIG. 3 shows an example top-10 "OLAP" papers 300 in the DBLP subset. The papers are nodes/objects in this example, and each of the calculated Object Rank values are shown to the left of the top-10 nodes listed. In this example, many entries (e.g., the "Data Cube" and the "Modeling Multidimensional Databases" papers in FIG. 2) of the top-10 list do not contain the keyword "OLAP". In fact, the keyword "OLAP" is not even contained in the abstracts of these two papers, but they clearly constitute important papers in the OLAP area, since they may be referenced by other papers of the OLAP area or may have been written by authors who have written other important "OLAP" papers.

FIG. 5 shows an example process of analyzing digital information to generate a keyword-specific ranking of nodes based on a query. A query including one or more keywords can be received at 510 (e.g., by query module 150). One or more initial rankings can be generated for the one or more keywords based on a flow of authority among nodes along edges in a labeled graph at 520 (e.g., by object rank execution module 110). Multiple initial rankings can be generated corresponding to multiple keywords of the query, where each of the multiple initial rankings indicate authority of the nodes in the graph (representing a database of digital information) with respect to each respective keyword. Such initial ranking(s) can then be combined to generate a keyword-specific ranking of the nodes at 530 (e.g., by query module 150).

Generation of the initial rankings of nodes for respective keywords can involve generating the initial rankings using a flow of authority in the graph derived at least in part from different authority transfer rates assigned to the edges based on edge type information. Conceptually, this ranking process can be understood as being produced in the following way. Myriads of random surfers are initially found at the objects containing the keyword "OLAP". These surfers then traverse the database graph in the following manner. At any time step, a random surfer is found at a node and either (i) makes a move to an adjacent node by traversing an edge, or (ii) jumps randomly to an "OLAP" node without following any of the links. The probability that a particular traversal happens depends on multiple factors, including the type of the edge (in contrast with traditional Web link-based search systems). The factors that affect how such a random surfer traverses the database graph can be depicted in an authority transfer schema graph.

FIG. 6 shows the authority transfer schema graph, for the schema graph of FIG. 4, that corresponds to the setting that produced the results of FIG. 3. Assuming that the probability that the surfer moves back to an "OLAP" node (the damping factor) is 15%, the collective probability to move to a referenced paper can be 85%×70% (70% being the authority transfer rate of the citation edge shown in FIG. 6), the collective probability to move to an author of the paper can be 85%×20%, the probability to move from the paper to the forum where the paper appeared is up to 85%×10%, and so on (as shown in FIG. 6). As time goes on, the expected percentage of surfers at each node v converges (as described in further details below) to a limit r(v). Intuitively, this limit is the Object Rank of the node.

An alternative way to conceive the intuition behind the Object Rank systems and techniques described here is to consider that authority/importance flows in a database graph until a state of equilibrium is attained. Initially the "OLAP" authority is found at the objects that contain the keyword "OLAP". Then authority/importance flows, following the rules in the authority transfer schema graph, until an equilibrium is established that specifies that a paper is authoritative if it is referenced by authoritative papers, is written by authoritative authors and appears in authoritative conferences. Vice versa, authors and conferences obtain their authority from their papers. The amount of authority flow from paper-to-cited-paper or from paper-to-author or from author-to-paper, can be arbitrarily set by a domain expert and generally reflects the semantics of the domain. For example, common sense says that in the bibliography domain, a paper obtains very little authority (or even none) by referring to authoritative papers (0 authority transfer for "cited" edge-types in FIG. 6). On the contrary, a paper obtains a lot of authority by being referred by authoritative papers (0.7 authority transfer for "cites" edge-types in FIG. 6).

The random surfer approach to authority-based search can be described as follows. Let (V,E) be a graph, with a set of nodes V={$v_1, \ldots, v_n$} and a set of edges E. A surfer starts from a random node (e.g., a web page) $v_i$ of V and at each step, the surfer follows a hyperlink with probability d or gets bored and jumps to a random node with probability 1−d. The PageRank value of $v_i$ is the probability $r(v_i)$ that at a given point in time, the surfer is at $v_i$. Denoting by the vector r=[r($v_1$), . . . , r($v_i$), . . . , r($v_n$)]$^T$, then $$r = dAr + \frac{(1-d)}{|V|}e \qquad (1)$$

where A is a n×n matrix with $$A_{ij} = \frac{1}{OutDeg(v_j)}$$

if there is an edge $v_j \rightarrow v_i$ in E and 0 otherwise, where OutDeg($v_j$) is the outgoing degree of node $v_j$. Also, e=[1, . . . , 1]$^T$. In a typical PageRank application, equation (1) is precomputed before the queries arrive and provides a global, keyword-independent ranking of the pages.

Instead of using the whole set of nodes V as the base set (the set of nodes where the surfer jumps when bored) one can use an arbitrary subset S of nodes, hence increasing the authority associated with the nodes of S and the ones most closely associated with the nodes of S. A base vector, s=[$s_0, \ldots, s_i, \ldots, s_n$], can be defined where $s_i$ is 1 if $v_i \in S$ and 0 otherwise. In this case, the PageRank equation is $$r = dA + \frac{(1-d)}{|S|}s \qquad (2)$$

However, regardless of whether equation (1) of equation (2) is used, the PageRank algorithm can solve this fixpoint using an iterative method, where the values of the (k+1)-th execution are calculated as follows:

$$r^{(k+1)} = dAr^{(k)} + \frac{(1-d)}{|S|}s \qquad (3)$$

The algorithm can terminate when r converges, which can be guaranteed to happen under very common conditions. In particular, A needs to be irreducible (i.e., (V,E) be strongly connected) and a periodic. The former is true due to the damping factor d, while the latter happens in practice.

Use of the base set S has been suggested as a way to do personalized rankings, by setting S to be the set of bookmarks of a user. In addition, others have proposed using the base set S to perform topic-specific PageRank on the Web. In the description below, the base set S can be used to estimate the relevance of a node to a keyword query. For example, the base set used in generating an initial ranking of nodes can consist of the nodes that contain the keyword of a query.

Furthermore, the Object Rank systems and techniques described can rank the nodes of a database with respect to a given keyword query using a set of calibrating (adjusting) parameters, such as shown in the following table:

TABLE 1

Example Parameters of Object Rank System

| Parameter Property | Parameter |
|---|---|
| Application-Specific | Authority Transfer Rates, Global Object Rank Calculation, Damping Factor |
| Combination of Scores | Normalization Scheme, Global Object Rank Weight, AND or OR semantics |
| Performance | Epsilon, threshold |

Initially, the database and the authority transfer graph can be modeled. A database can be viewed (e.g., modeled) as a labeled graph, which is a model that readily captures both relational and XML (extensible Markup Language) databases. The data graph $D(V_D, E_D)$ is a labeled directed graph where every node v has a label $\lambda(v)$ and a set of keywords. For example, the node "ICDE 1997" of FIG. 2 has label "Year" and the set of keywords {"ICDE", "1997", "Birmingham"}. Each node represents an object of the database and may have a sub-structure. Without loss of generality, the Object Rank system can assume that each node has a tuple of attribute name/attribute value pairs. For example, the "Year" nodes of FIG. 2 have name, year and location attributes. The keywords appearing in the attribute values comprise the set of keywords associated with the node. One may assume richer semantics by including the metadata of a node in the set of keywords. For example, the metadata "Forum", "Year", "Location" could be included in the keywords of a node. The specifics of modeling the data of a node are orthogonal to Object Rank techniques being described and can be readily implemented for a given data set by those skilled in the relevant art.

Each edge e from u to v can be labeled with its role $\lambda(e)$ ($\lambda$ can be overloaded) and represents a relationship between u and v. For example, every "paper" to "paper" edge of FIG. 2 has the label "cites". When the role is evident and uniquely defined from the labels of u and v, the edge label can be omitted. For the purpose of clarity, the discussion below assumes that there are no parallel edges and an edge e from u to v is often denoted as "u>v".

The schema graph $G(V_G, E_G)$ shown in FIG. 4 is a directed graph that describes the structure of D. Every node has an associated label. Each edge is labeled with a role, which may be omitted, as discussed above for data graph edge labels. A data graph $D(V_D, E_D)$ conforms to a schema graph $G(V_G, E_G)$ if there is a unique assignment µ such that:

1. for every node $v \in V_D$ there is a node $\mu(v) \in V_G$ such that $\lambda(v) = \lambda(\mu(v))$;
2. for every edge $e \in E_D$ from node u to node v there is an edge $\mu(e) \in E_G$ that goes from $\mu(u)$ to $\mu(v)$ and $\lambda(e) = \lambda(\mu(e))$.

From the schema graph $G(V_G, E_G)$, an authority transfer schema graph $G^A(V_G, E^A)$ can be created to reflect the authority flow through the edges of the graph, as shown in FIG. 6. The values assigned in the authority transfer schema graph can be set by a trial and error process (run until with the quality of the results are satisfactory) or by a domain expert. For each edge $e_G = (u > v)$ of $E_G$, two authority transfer edges, $e^f_G = (u > v)$ and $e^b_G = (v > u)$ can be created. The two edges can carry the label of the schema graph edge and, in addition, each one can be annotated with a (potentially different) authority transfer rate $\alpha(e^f_G)$ and $\alpha(e^b_G)$ correspondingly. The authority transfer schema graph can have all the information of the original schema graph (compare FIGS. 6 and 4), and a data graph can be considered to conform to an authority transfer schema graph if it conforms to the corresponding schema graph.

FIG. 6 shows the authority transfer schema graph that corresponds to the schema graph of FIG. 4 (the edge labels are omitted). The motivation for defining two edges for each edge of the schema graph is that authority potentially flows in both directions and not only in the direction that appears in the schema. For example, a paper passes its authority to its authors and vice versa. However, that the authority flow in each direction (defined by the authority transfer rate) may not be the same. For example, a paper that is cited by important papers is clearly important but citing important papers does not make a paper important.

Additionally, the sum of authority transfer rates of the out-going edges of a schema node u may be less than 1 (in terms of the random walk model, this would be equivalent to the disappearance of a surfer), if the administrator believes that the edges starting from u do not transfer much authority. For example, in FIG. 6, conferences only transfer 30% of their authority.

Given a data graph $D(V_D, E_D)$ that conforms to an authority transfer schema graph $G^A(V_G, E^A)$, an Object Rank system can derive an authority transfer data graph $D^A(V_D, E^A)$ (FIG. 7) as follows. For every edge $e = (u > v) \in E_D$ the authority transfer data graph has two edges $e^f = (u > v)$ and $e^b = (v > u)$.

The edges $e^f$ and $e^b$ can be annotated with authority transfer rates $\alpha(e^f)$ and $\alpha(e^b)$. Assuming that $e^f$ is of type $e_G^f$, then $$\alpha(e^f) = \begin{cases} \dfrac{\alpha(e_G^f)}{OutDeg(u, e_G^f)}, & \text{if } OutDeg(u, e_G^f) > 0 \\ 0, & \text{if } OutDeg(u, e_G^f) = 0 \end{cases} \quad (4)$$

where $OutDeg(u, e_G^f)$ is the number of outgoing edges from u, of type $e_G^f$. The authority transfer rate $\alpha(e^b)$ can be defined similarly. FIG. 7 shows the authority transfer data graph that corresponds to the data graph of FIG. 2 and the authority schema transfer graph of FIG. 6. As shown, the sum of authority transfer rates of the outgoing edges of a node u of type $\mu(u)$ may be less than the sum of authority transfer rates of the outgoing edges of $\mu(u)$ in the authority transfer schema graph, if u does not have all types of outgoing edges.

With the authority transfer schema and data graphs in hand, keyword-specific and global Object Ranks can be calculated and combined to produce the final score of a node. The score of a node v with respect to a keyword query w can be a combination of the global Object Rank $r^G(v)$ of v and the keyword-specific Object Rank $r^w(v)$. The combining function can be:

$$r^{w,G}(v) = r^w(v) \cdot (r^G(v))^g \quad (5)$$

where g is the global Object Rank weight, which determines how important the global Object Rank is. The value of g may be accessible to the users or fixed by an administrator. Moreover, other combining functions may be used as well.

The calculations of the keyword-specific and the global Object Rank can be performed as follows (initially assuming single-keyword queries). For keyword-specific Object Rank, given a single keyword query w, the keyword base set S(w) (referred to below as the base set when the keyword is implied) of objects that contain the keyword w can be found. An Object Rank $r^w(v_i)$ can be assigned to every node $v_i \in V_D$ by resolving the equation $$r^w = dAr^w + \frac{(1-d)}{|S(w)|}s \qquad (6)$$

where $A_{ij} = \alpha(e)$ if there is an edge $e=(v_j, v_i)$ in $E^A_D$ and 0 otherwise, d controls the base set importance, and $s=[s_1, \ldots, s_n]^T$ is the base set vector for $S(w)$ ($s_i=1$ if $v_i \in S(w)$ and $s_i=0$ otherwise).

The damping factor d determines the portion of Object Rank that an object transfers to its neighbors as opposed to keeping to itself. The damping factor can be used to ensure convergence in the case of node sinks. In addition, the damping factor can serve as a calibrating factor in the present systems and techniques, since by decreasing d, objects that actually contain the keywords (those objects in the base set) are favored as opposed to objects that acquire Object Rank through the incoming edges. The value for d can be 0.85 when a balance between the importance of containing the actual keywords as opposed to being pointed by nodes containing the keywords is sought.

The definition of global Object Rank can be different for different applications or even users of the same application. In some implementations, the global Object Rank can be calculated applying the random surfer model, and including all nodes in the base set. The same calibrating parameters can be made available as in the keyword-specific Object Rank. This calculation of the global Object Rank can assume that all nodes initially have the same value. Alternatively, some implementations can assign disparate initial values to the nodes.

With respect to multiple-keyword queries, "$w_1, \ldots, w_m$", the semantics of the query can be defined by extending the random walk model. Considering m independent random surfers, where the ith surfer starts from the keyword base set $S(w_i)$, the following analysis can be performed. For AND semantics, the Object Rank of an object v with respect to the m-keywords query is the probability that, at a given point in time, the m random surfers are simultaneously at v. Hence the Object Rank $r_{AND}^{w_1, \ldots, w_m}(v)$ of the node v with respect to the m keywords is $$r_{AND}^{w_1, \ldots, w_m}(v) = \prod_{i=1,\ldots,m} r^{w_i}(v) \qquad (7)$$

where $r^{w_i}(v)$ is the Object Rank with respect to the keyword $w_i$.

For OR semantics, the Object Rank of v is the probability that, at a given point in time, at least one of the m random surfers will reach v. Hence, for two keywords $w_1$ and $w_2$ it is $$r_{OR}^{w_1, w_2}(v) = r^{w_1}(v) + r^{w_2}(v) - r^{w_1}(v)r^{w_2}(v) \qquad (8)$$

and for more than two, it is defined accordingly.

The combining function of Equation (7) tends to favor the more popular keywords in the query. The distribution of Object Rank values tends to be more skewed when the size $|S(w)|$ of the base set $S(w)$ increases, because the top objects tend to receive more references. For example, consider two results 800 for the query "XML AND Index" shown in FIG. 8. Result (b) corresponds to the model described above. It noticeably favors the "Index" keyword over the "XML".

The first paper is the only one in the database that contains both keywords in the title. However, the next three results are all classic works on indexing and do not apply directly to XML. Intuitively, "XML" as a more specific keyword is likely more important to the user. Indeed, the result of FIG. 8 (a) was overwhelmingly preferred over the result of FIG. 8 (b) by participants of a relevance feedback survey. The latter result contains important works on indexing in semistructured, unstructured, and object-oriented databases, which are more relevant to indexing of XML data. This result is obtained by using the modified formula:

$$r^{w_1, \ldots, w_m}(v) = \prod_{i=1,\ldots,m} (r^{w_i}(v))^{g(w_i)} \qquad (9)$$

where $g(w_i)$ is a normalizing exponent, set to $g(w_i)=1/\log(|S(w_i)|)$. Using the normalizing exponents g("XML") and g("Index") in the above example can be equivalent to running in parallel g("XML") and g("Index") random walks for the "XML" and the "Index" keywords respectively. Thus, the keywords can be weighted by frequency.

In contrast with the combining of single-keyword object rankings, as described above, alternative semantics can be used to calculate the object ranking for multiple keywords. For example, all objects with at least one of the multiple keywords can be combined into a single base set. Then a single execution of the Object Rank algorithm can be used to determine the scores of the objects. Such "single base set" semantics can be achieved by combining single-keyword Object Rank values applying appropriate exponents, as described above. Furthermore, certain potential problems of single-base-set semantics may be avoided using the multiple base sets approach (where each base set can be specific to one keyword of the query).

In order to compare to the single-base-set approach for AND semantics (Equation (7)), the following description considers two scenarios and assumes without loss of generality that there are two keywords. First, the base set S can be made to include objects that contain both keywords. These objects will be in both keyword-specific base sets as well, so these objects and objects pointed by them will receive a top rank in both approaches. Second, if S contains objects containing either of the two keywords, an object that is only pointed by objects containing one keyword may end up being ranked highest. This cannot happen with the keyword-specific base sets approach. For example, in FIG. 9, the single-base-set approach 900 would rank the R* paper higher than the DataGuides paper for the query "XML AND Index", even though the R* paper is irrelevant to XML.

For OR semantics (Equation (8)), the base set S in the single-base-set approach is the union of the keyword-specific base sets. Comparing to an improved approach, where objects in the base set are weighted according to the keywords they contain, such that infrequent keywords are assigned higher weight: if an object contains both keywords, for a two keyword query, it can be assigned a base Object Rank of $$(1-d) \cdot \left( \frac{1}{|S(w_1)|} + \frac{1}{|S(w_2)|} \right).$$

Then, using the Linearity Theorem (described in G. Jeh and J. Widom; Scaling Personalized Web Search; WWW Conference, 2003), it can be shown that the Object Ranks calculated by both approaches are essentially the same.

Referring again to FIG. 1, an example architecture of an Object Rank system 100 is shown. The system 100 is divided into two stages. A preprocessing stage includes an Object Rank execution module 110, which connects to a database 120 to be indexed. The database 120 can be part of database management system (DBMS) and can be a relational, object oriented, XML, hierarchical, or other database. For example, the system 100 can be implemented using the Oracle 9i RDBMS (available from Oracle Corporation of Redwood Shores, Calif.), on a Xeon 2.2 GHz computer with 1 Gigabyte of Random Access Memory (available from Intel Corporation of Santa Clara, Calif.).

The Object Rank execution module 110 can receive as input the set of all keywords 114 that will be indexed and a set of parameters 112, which can include (i) the damping factor d, (ii) the authority transfer rates $\alpha(e_G)$'s of the authority transfer schema graph $G^A$, (iii) a convergence constant epsilon (which determines when the Object Rank algorithm converges), and (iv) the threshold value (which determines the minimum Object Rank that an object must have to be stored in the Object Rank Index).

The Object Rank execution module 110 creates the Object Rank Index 130 (which can be an inverted index) indexed by the keywords. For each keyword w, the Object Rank Index 130 can store a list of $<id(u), r^w(u)>$ pairs for each object u that has $r^w(u) \geq$ threshold. The pairs can be sorted by descending $r^w(u)$ to facilitate an efficient querying method as described below. The Object Rank Index 130 can be implemented as an index-based table, where the lists are stored in a CLOB (Character Large Object Block) attribute. A hash-index can be built on top of each list to allow for random access by the Query module 150.

A query stage includes the Query module 150, which inputs keyword(s) 152, a set of sorted $<id(u), r^w(u)>$ pairs lists $L_1, \ldots, L_m$ from the Rank Index 130, and a set of adjusting parameters 154, which can include (i) the semantics to be used (AND or OR), (ii) the normalization scheme (e.g., the exponents to use), and (iii) the global Object Rank weight. The Query module 150 outputs identifiers (ids) 156 for the top-k objects according to the combining function (Equation (7) or (8)).

One approach would be to make one pass of all lists to calculate the final Object Rank values for each object and then sort this list by final Object Rank. Alternatively, the Threshold Algorithm (described in R. Fagin, A. Lotem, and M. Naor; Optimal Aggregation Algorithms for Middleware; ACM PODS, 2001) can be used to read a minimum prefix of each list. The Threshold Algorithm is applicable since both combining functions (Equations (7) and (8)) are monotone, and random access is possible on the stored lists.

The query stage also includes a Database Access module 160 that receives the result ids 156 and queries the database 120 to get the suitable result information 162 to present the objects to the user. This information can be stored into an id-indexed table, that contains a CLOB attribute value for each object id. For example, a paper object CLOB can contain the paper title, the authors' names, and the conference name and year.

Creation of the Object Rank index can be done in various ways. For the case of arbitrary authority transfer data graphs $D^A$, FIG. 10 shows pseudo code 1000 for a process that creates the Object Rank index. This process accesses the authority transfer data graph $D^A$ many times, which can lead to long execution times if $D^A$ is very large. In typically scenarios, this is not a problem since $D^A$ only stores object ids and a set of edges which is typically small enough to fit into main memory for most databases.

When $D^A$ is a directed acyclic graph (DAG), improved performance can be realized. There are many applications where the authority transfer data graph is a DAG. For example a database of papers and their citations (ignoring author and conference objects), where each paper only cites previously published papers, is a DAG. FIG. 11 shows pseudo code 1100 for an improved process, which makes a single pass of the graph $D^A$ and computes the actual Object Rank values for DAGs. In this case, epsilon need not be used since the precise solution of Equation (6) can be derived, in contrast to the algorithm of FIG. 10, which calculates approximate values. The intuition is that Object Rank is only transferred in the direction of the topological ordering, so a single pass suffices.

Topologically sorting a graph $G(V,E)$ takes time $\Theta(V+E)$ in the general case. In many cases the semantics of the database can lead to a better process. For example, in the papers database, topologically sorting the papers can be done efficiently by first sorting the conferences by date. This method is generally applicable for databases where a temporal or other kind of ordering is implied by the link structure.

In the above example, the DAG property was implied by the semantics. However, in some cases this property can be inferred by the structure of the authority transfer schema graph $G^A$, such as illustrated by the following observation: the authority transfer data graph $D^A$ can be a DAG if and (1) the authority transfer schema graph $G^A$ is a DAG, or (2) for every cycle c in $G^A$, the subgraph $D'^A$ of $D^A$ consisting of the nodes (and the edges connecting them), whose type is one of the schema nodes of c, is a DAG.

In practice, the authority transfer data graph $D^A$ will often not be DAG but rather almost DAG. When $D^A$ is almost DAG, that is, there is a small set U of backedges, this graph structure can also be taken advantage of. If such edges are removed, $D^A$ becomes a DAG. It should be noted here that the set U need not be unique in that there can be many minimal (i.e., no edge can be removed from U) sets of backedges. Thus, instead of working with the set of backedges U, a set L of backnodes can be used. Such backnodes are nodes from which the backedges start. This can reduce the number of needed variables as shown below, since $|L| \leq |U|$.

In the papers database example (when author and conference objects are ignored), L is the set of papers citing a paper that was not published previously. Similarly, in a complaints database example (described below in connection with FIG. 16), most complaints reference previous complaints. Identifying the minimum set of backnodes is NP-complete (Proven by reducing Vertex Cover to it) in the general case. However, the semantics of the database can lead to efficient processes. For example, for the papers database and the complaints database examples, a backnode is simply an object referencing an object with a newer timestamp.

FIG. 12 shows pseudo code 1200 for creating Object Rank index for graphs that are almost DAG. The basis of this approach is as follows: the Object Rank of each node can be split to the DAG-ObjectRank which is calculated ignoring the backedges, and the backedges-ObjectRank which is due to the backedges. To calculate backedges-ObjectRank a variable $c_i$ can be assigned to each backnode $c_i$ (for brevity, the same symbol is used to denote a backnode and its Object Rank), denoting its Object Rank. Before doing keyword-specific calculation, a calculation can be made as to how $c_i$'s are propagated to the rest of the graph $D^A$ (line 5 in code 1200), and this information can be stored in C. Hence $C_{ij}$ is the coefficient with which to multiply $c_j$ when calculating the Object Rank of node $v_i$. To calculate C (lines 13-15 in code 1200) the backedges can be considered as the only source of Object Rank, and one pass of the DAG can be made in topological order.

Then, for each keyword-specific base set: (a) calculate the DAG-ObjectRanks r' (line 7 in code 1200) ignoring the backedges (but taking them into account when calculating the outgoing degrees), (b) calculate $c_i$'s solving a linear system (line 8 in code 1200), and (c) calculate the total Object Ranks (line 10 in code 1200) by adding the backedge-ObjectRank (C•c) and the DAG-ObjectRank (r'). Each line of the system of line 8 corresponds to a backnode $c_i \equiv v_j$ (the ith backnode is the jth node of the topologically sorted authority transfer data graph $D'^A$) whose Object Rank $c_i$ is the sum of the backedge-ObjectRank ($C_j \cdot c$) and the DAG-ObjectRank ($r'_j$). The overline notation on the matrices of this equation selects the L lines from each table that correspond to the backnodes.

Figure 13A:
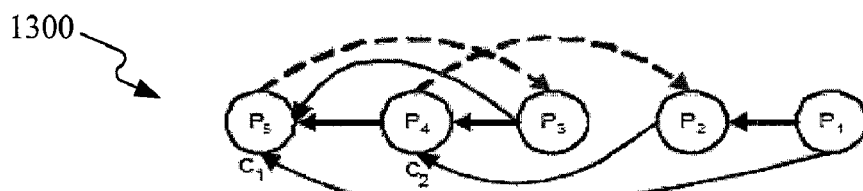
FIGS. 13A and 13B show an example almost DAG.
Figure 13B:
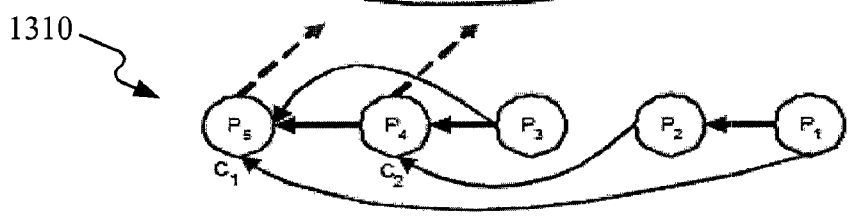

This process is further illustrated in the example shown in FIGS. 13A and 13B. A graph $D^A$ 1300 is shown in FIG. 13A. Assume d=0.5 and all edges are of the same type t with authority transfer rate $\alpha(t)=1$. First the graph can be topologically sorted, and the backnodes can be identified: $c_1 \equiv P_5$, $c_2 \equiv P_4$. Then the coefficients table C can be created (line 5 in code 1200) as follows:

$$r(P_1) = 0$$
$$r(P_2) = 0.5 \cdot 0.5 \cdot c_2 = 0.25 \cdot c_2$$
$$r(P_3) = 0.5 \cdot c_1$$
$$r(P_4) = 0.5 \cdot r(P_2) + 0.5 \cdot 0.5 \cdot r(P_3) = 0.125 \cdot c_1 + 0.125 \cdot c_2$$
$$r(P_5) = 0.5 \cdot 0.5 \cdot r(P_3) + 0.5 \cdot 0.5 \cdot r(P_4) = 0.156 \cdot c_1 + 0.031 \cdot c_2$$

$$c = \begin{bmatrix} 0 & 0 \\ 0 & 0.25 \\ 0.5 & 0 \\ 0.125 & 0.125 \\ 0.156 & 0.031 \end{bmatrix}$$

When building the index for one keyword w contained in nodes $P_1$ and $P_3$. Object Ranks for $D'^A$ 1310 can be calculated (line 7 in code 1200), which can be taken by removing the backedges (dotted lines) from $D^A$ 1300 (as shown in FIGS. 13A and 13B).

$r(P_1)=0.5$
$r(P_2)=0.5 \cdot 0.5 \cdot r(P_1)=0.125$
$r(P_3)=0.5$
$r(P_4)=0.5 \cdot 0.5 \cdot r(P_3)+0.5 \cdot r(P_2)=0.188$
$r(P_5)=0.5 \cdot 0.5 \cdot r(P_4)+0.5 \cdot 0.5 \cdot r(P_3)+0.5 \cdot 0.5 \cdot r(P_1)=0.297$ $r'=[0.5 0.125 0.5 0.188 0.297]^T$ Solving the equation of line 8 (in code 1200) then gives $$\begin{bmatrix} c_1 \\ c_2 \end{bmatrix} = \begin{bmatrix} 0.156 & 0.031 \\ 0.125 & 0.125 \end{bmatrix} \begin{bmatrix} c_1 \\ c_2 \end{bmatrix} + \begin{bmatrix} 0.297 \\ 0.188 \end{bmatrix}$$

and $c=[0.361\ 0.263]^T$, where the overline-notation selects from the matrices the 5-th and the 4-th lines, which correspond to the backnodes $c_1$ and $C_2$ respectively. The final Object Ranks are (line 10 in code 1200): $r=[0.5\ 0.190\ 0.680\ 0.266\ 0361]^T$.

This algorithm can be viewed as a way to reduce the n×n Object Rank calculation system of Equation (6), where n is the size of the graph, to the much smaller |L|×|L| equations system of line 8 in the code 1200 of FIG. 12. The two equations systems have the same format, r=Ar+b, only with different coefficient tables A,b. The degree of reduction achieved can be inversely proportional to the number of backnodes.

The linear, first-degree equations system of line 8 in the code 1200 can be solved using various arithmetic methods, such as the Jacobi and Gauss-Seidel method (see e.g., G. H. Golub and C. F. Loan; Matrix Computations; Johns Hopkins, 1996), or even using the PageRank iterative approach which may be simpler, and may result in better performance, because each equation need not be solved with respect to a variable (see e.g., S. Brin and L. Page; The Anatomy of a Large-Scale Hypertextual Web Search Engine; WWW Conference, 1998).

Figure 14:
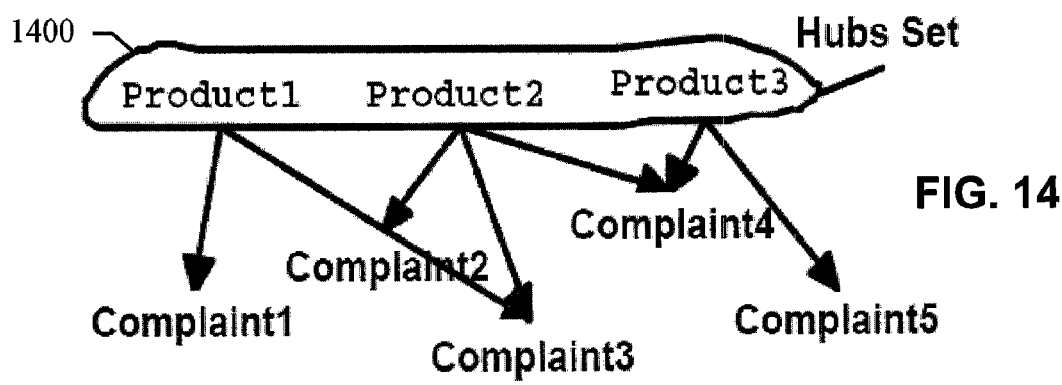
FIG. 14 shows an example hierarchical graph of a complaints database.

Similarly to the almost-DAG case, the Object Rank calculation can be reduced to a much smaller system (than the one of Equation (6)) if the authority transfer data graph $D^A$ contains a relatively small vertex cover H. For example, consider a subset of the complaints database (FIG. 16) consisting of the products and the complaints (without the reference edge to other complaints). Then H is the set of the products as shown in FIG. 14 (a complaint can refer to more than one products). The nodes of H can be considered hub-nodes or a Hubs Set 1400.

In view of this type of database, an optimization can be realized based on the following: Let $r(h_i)$ be the Object Rank of hub-node $h_i$. First, the Object Rank of every non-hub-node i is expressed as a function of the Object Ranks of the hub-nodes pointing to i. Then the $r(h_i)$ is expressed as a function of the non-hub-nodes pointing to $h_i$. This expression is equal to $r(h_i)$, resulting in |H| such equations for the |H| hub-nodes. Hence the computation can be reduced to a |H|×|H| linear, first-degree system. Additional improvements can also be obtained when the authority transfer graph is a DAG of sub-graphs.

The Object Rank calculation of the whole graph $D^A(V_D, E_D^A)$ can in some instances be serialized over Object Rank calculations for disjoint, non-empty sub-sets $L_1, \ldots, L_r$ of $V_D$, where $L_1 \cup \ldots \cup L_r \equiv V_D$. The calculation is serializable if the Object Ranks for $L_1$ are first calculated, then these Object Ranks can be used to calculate the Object Ranks of $L_2$, and so on.

Figure 15:
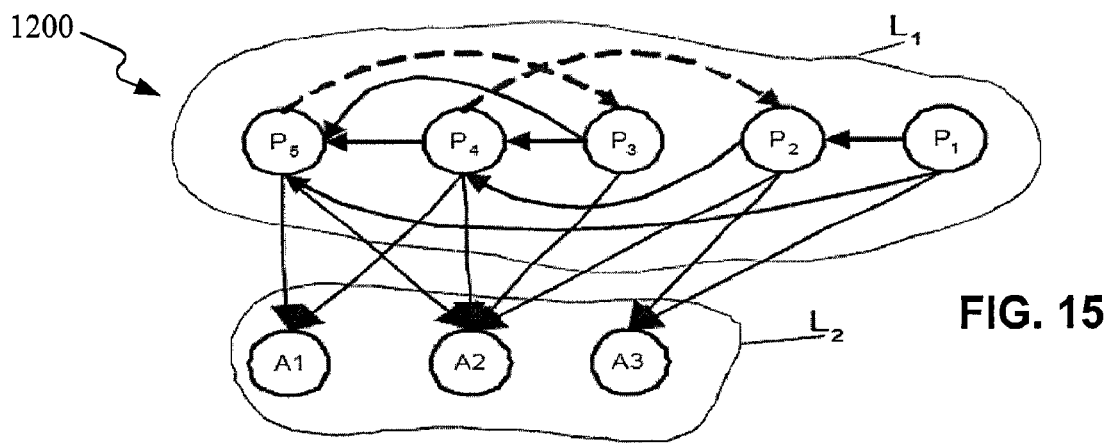
FIG. 15 shows an example serializable authority transfer data graph.

For example, consider the subset of the papers database consisting of the papers, their citations and the authors, where authority is transferred between the papers and from a paper to its authors (and not vice versa). FIG. 15 shows how this authority transfer data graph 1500 can be serialized. In particular, the Object Ranks for the nodes in $L_1$ can be calculated, and then the Object Ranks for the nodes in $L_2$ can be calculated.

To define when the calculation is serializable, first define the graph $D'^A(V',E')$ with $V'=\{L_1 \cup \ldots \cup L_r\}$ and $E'=\{(L_i, L_j) | \exists (v_i, v_j) \in E_D^A \wedge v_i \in L_i \wedge v_j \in L_j\}$. That is, there is an edge $(L_i, L_j)$ in $D'^A$ if there is an edge between two nodes $v_i \in L_i$, $v_j \in L_j$ of $D^A$. Therefore, the Object Rank calculation for $D^A$ can be serialized if $D'^A$ is a DAG.

The algorithm works as follows: Let $L_1, \ldots, L_r$ be topologically ordered. First, the Object Ranks of the nodes in $L_1$ are computed ignoring the rest of DA. Then do the same for $L_2$, including in the computation the set I of nodes (and the corresponding connecting edges) of $L_1$ connected to nodes in $L_2$. Notice that the Object Ranks of the nodes in I are not changed since there is no incoming edge from any node of $L_2$ to any node in I. Notice that any of the Object Rank calculations methods described above can be used in each subset $L_i$.

Various improvements can also be realized by manipulating initial Object Rank values before iterative processing. The processes described above generally assume a fresh execution of for every keyword. However, nodes with high global Object Rank can be expected to also have high Object Rank with respect to many keywords. This can be taken advantage of by assigning the global Object Ranks as initial values for each keyword specific calculation.

Furthermore, various space versus time tradeoffs can be made. For example, if there are limitations on the index size, then a prefix (the first p nodes) of the nodes' list can be stored (recall that the lists can be ordered by Object Rank) for each keyword. During the query stage, these values can be used as initial values for the p nodes and a constant (e.g., 0.03) for the rest. Moreover, using the global Object Ranks instead of a constant for the rest of the nodes may be less efficient because, if a node u is not in the top-p nodes for keyword k, u probably has a very small Object Rank with respect to k. However, u may have a large global Object Rank.

Two surveys were conducted to evaluate the quality of the results of the Object Rank systems and techniques described herein. The first was performed on the DBLP database, with eight professors and Ph.D. students from the UC, San Diego database lab, who were not involved with the project. The second survey used the publications database of the IEEE Communications Society (COMSOC) (http:www-comsoc-org) and involved five senior Ph.D. students from the Electrical Engineering Department.

Each participant was asked to compare and rank two to five lists of top-10 results for a set of keyword queries, assigning a score of 1 to 10, according to the relevance of the results list to the query. Each result list was generated by a different variation of the Object Rank techniques described. One of the results lists in each set was generated by the "default" Object Rank configuration which used the authority transfer schema graph of FIG. 6 and d=0.85. The users knew nothing about the algorithms that produced each result list. The survey was designed to investigate the quality of Object Rank when compared to other approaches or when changing the adjusting parameters.

An initial check regarded the effect of keyword-specific ranking/scores. In particular, comparing the default Object Rank with the global ranking algorithm that sorts objects that contain the keywords according to their global Object Rank (where the base-set contains all nodes). This latter approach is similar to the approach traditionally taken by Google Inc. (of Mountain View, Calif.) for Web pages, modulo some minor difference on the calculation of the relevance score. The DBLP survey included results for two keyword queries: "OLAP" and "XML". The score was 7:1 and 5:3 in favor of the keyword-specific Object Rank for the first and second keyword queries respectively. The COMSOC survey used the keywords "CDMA" and "UWB (ultra wideband)" and the scores were 4:1 and 5:0 in favor of the keyword-specific approach respectively.

To assess the effect of authority transfer rates, results of the default Object Rank were compared with a simpler version of the algorithm that did not use different authority transfer rates for different edge types, i.e., all edge types were treated equally. In the DBLP survey, for both keyword queries, "OLAP" and "XML", the default Object Rank won with scores 5:3 and 6.5:1.5 (the half point means that a user thought that both rankings were equally good) respectively. In the COMSOC survey, the scores for "CDMA" and "UWB" were 3.5:1.5 and 5:0 respectively.

To assess the effect of the damping factor d, three different values of the damping factor d: 0.1, 0.85, and 0.99, were tested for the keyword queries "XML" and "XML AND Index" on the DBLP dataset. Two points were given to the first choice of a user and one point to the second. The scores were 2.5:8:13.5 and 10.5:11.5:2 (the sum is 24 since there are 8 users times 3 points per query) respectively for the three d values. Higher d values were preferred for the "XML", probably because "XML" is a very large area. In contrast, small d values are preferable for "XML AND Index", probably because few papers are closely related to both keywords, and these papers typically contain both of them. The results were also mixed in the COMSOC survey. In particular, the damping factors 0.1, 0.85, and 0.99 received scores of 5:6:4 and 4.5:3.5:7 for the queries "CDMA" and "UWB" respectively.

To assess the effect of changing the weights of the keywords, the combining functions for AND semantics of Equations (7) and (9) were compared for the two-keyword queries "XML AND Index" and "XML AND Query", in the DBLP survey. The use of the normalizing exponents proposed above was preferred over the simple product function with ratios of 6:2 and 6.5:1.5 respectively. In the COMSOC survey, the same experiment was repeated for the keyword query "diversity combining". The use of normalizing exponents was preferred at a ratio of 3.5:1.5.

Thus, an adjustable framework to answer keyword queries using the authority transfer approach has been described, which framework is applicable to a significant number of domains. This framework can be efficient and semantically meaningful, as demonstrated by the experimental evaluation and user surveys. Moreover, this framework can be applied with small modifications to various other applications where the authority transfer approach is applicable. For example, consider an example complaints database (FIG. 16), which stores the complaint reports of customers regarding products of the company. When ranking the complaint reports according to their urgency, the ranking can be influenced by deliberately pulling information from the database into to the initial settings for the ranking process. Given that the goal of the company is to keep the "good" customers satisfied, and the "goodness" of a customer may be indicated by the total sales associated with a customer, then the base set for the computation of the global Object Rank can be the set of customers, and each customer can be given a base Object Rank proportional to that customer's total sales amount. A reasonable assignment of authority transfer rates is shown in the authority transfer schema graph 1600 in FIG. 16.

The above systems and techniques offer to the user more than one set of authority flow settings, in order to accommodate multiple user profiles/requirements. This ability to customize authority flow schemes provides greater flexibility and utility in the Object Rank systems and techniques. For example, there can be one setting for users that primarily care for papers with high global importance and another for users that primarily care for papers that are directly or indirectly heavily referenced by papers that have the keywords.

In addition, keyword search in databases has some unique characteristics that can be capitalized on by the present systems and techniques. First, every database has different semantics, which can be used to improve the quality of the keyword search. In particular, unlike the Web, where all edges are hyperlinks, the database schema exhibits the types of edges, and the attributes of the nodes. Thus, instead of assigning weights to edges of the data graph according to the relevance of the incident nodes' text to the keywords, authority transfer rates can be assigned on the schema graph, which captures the semantics of the database (e.g., the relevance factor is reflected in the selection of the base set). Using the schema the ways in which authority flows across the nodes of the database graph can be specified. For example, the results of FIG. 3 were obtained by annotating the schema graph of FIG. 4 with the authority flow information that appears in FIG. 6.

Figure 16:
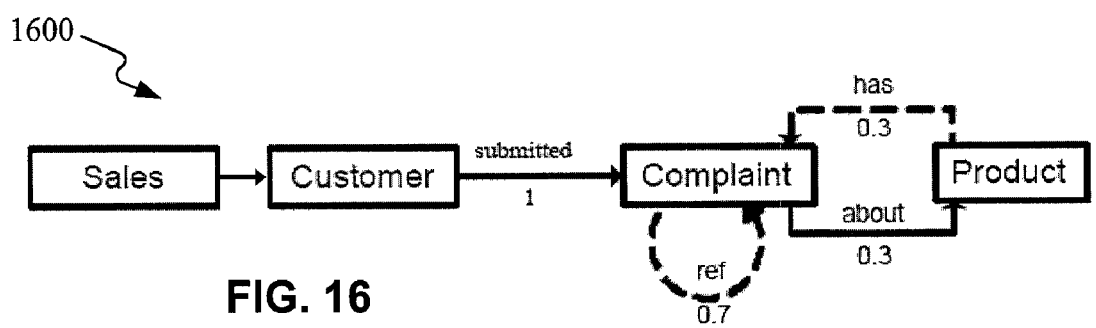
FIG. 16 shows an example authority transfer schema graph for a complaints database.

In the present search framework, a clear distinction is made between the global importance of a node and its relevance to a keyword query. Furthermore, previous work assumes that, when calculating the global importance, the random surfer has the same probability to start from any page p of the base set (this probability can be referred to as the base Object Rank of p). However, this is not true for every database. For example, consider a product complaints database (FIG. 16). In this case, the business value of a customer can be represented by assigning to his/her node a base Object Rank proportional to his/her total sales amount.

In addition, the present Object Rank systems and techniques provide significant adjustability, which allows for the tuning of the system according to the domain- and/or user-specific requirements. For example, for a bibliographic database, a new graduate student may desire a search system that returns the best reading list around the specified keywords, whereas a senior researcher may look for papers closely related to the keywords, even if they are not of a high quality. These preference scenarios are made possible by adjusting the weight of the global importance versus the relevance to the keyword query.

Changing the damping factor d offers another calibration opportunity. In particular, larger values of d favor nodes pointed by high-authority nodes, while smaller values of d favor nodes containing the actual keywords (e.g., nodes in the base set). The handling of queries with multiple keywords offers more flexibility to the system as described above, such as by allowing assignment of a higher weight to the relevance of a node with respect to an infrequent keyword.

On the performance level, calculating the Object Rank values in runtime can be a computationally intensive operation, especially when multiple users query the system. This can be resolved by precomputing an inverted index where, for each keyword, a sorted list of the nodes with non-trivial Object Rank for this keyword is created. During run-time the Threshold Algorithm can be employed to efficiently combine the lists. Regarding the space requirements associated with storing the inverted index, it should be recognized that the number of keywords of a database is typically limited, and less than the number of users in a personalized search system. Furthermore, nodes with Object Rank below a threshold value (e.g., as chosen by the system administrator) need not be stored, which offers a space versus precision tradeoff. In many applications, the index size may be small relative to the database size.

Regarding the index computation, two general classes of optimizations are presented and evaluated above. First, the structural properties of the database graph can be exploited. For example, if it is known that the objects of a subgraph of the schema form a Directed Acyclic Graph (DAG), then given a topological sort of the DAG, there is an efficient straightforward one-pass Object Rank evaluation. This DAG case can also be extended by providing a process that exploits the efficient evaluation for DAGs in the case where a graph is almost a DAG in the sense that it contains a large DAG sub-graph. In particular, given a graph G with n nodes, which is reduced to a DAG by removing a small subset of m nodes, the authority calculation can be reduced into a system of m equations—as opposed to the usual system of n equations, as described above. Furthermore, optimization techniques can also be realized when the data graph has a small vertex cover, or when the data graph can be split into a set of subgraphs and the connections between these subgraphs form a DAG.

Additionally, rather than calculate each keyword-specific Object Rank separately, it can be substantially more efficient to first calculate the global Object Rank, and use these scores as initial values for the keyword-specific computations. This can accelerate convergence, since in general, objects with high global Object Rank, also have high keyword-specific Object Ranks. Furthermore, storing a prefix of the inverted lists can allow faster calculation of the Object Ranks of all nodes.

2. IR Relevance Ranking in Keyword Searches

Various applications use plain text that coexists with structured data. Many commercial relational database management systems (RDBMSs) generally provide querying capabilities for text attributes that incorporate information retrieval (IR) relevance ranking strategies, but this search functionality may require that queries specify the exact column or columns against which a given list of keywords is to be matched. This requirement can be cumbersome and inflexible from a user perspective: good answers to a keyword query might need to be "assembled"—in perhaps unforeseen ways—by joining tuples from multiple relations.

The following sections describe techniques that adapt IR-style document-relevance ranking strategies to the problem of processing free-form keyword queries over RDBMSs. The present query model can handle queries with both AND and OR semantics, and exploit the sophisticated single-column text-search functionality often available in commercial RDBMSs. This application includes various query-processing strategies that build on a crucial characteristic of IR-style keyword search: only the few most relevant matches—according to some definition of "relevance"—are generally of interest. Consequently, rather than computing all matches for a keyword query, which leads to inefficient executions, the techniques described here focus on the top-k matches for the query, for moderate values of k. A thorough experimental evaluation over real data shows the performance advantages of the present approach.

The present approach incorporates IR ideas into keyword search in databases and uses the IR capabilities of commercial database systems to provide high-quality results to keyword queries on relational databases (the same ideas apply to any database that can be represented as a labeled graph, like XML). By using the IR engine of the DBMS, a system based on the present approach can be decoupled from the details of the IR ranking, and can be implemented as a lightweight middleware on top of an already operational database.

Notably, the present approach may be used to define a class of ranking functions with two components. The first component is the IR scores of the individual attribute values, which is calculated by the IR engine of the DBMS. The second component is the structure of a result-tree. This separation allows for efficient execution algorithms. On the performance level, algorithms are presented to efficiently compute the top results of a keyword query with respect to a wide class of combining (ranking) functions. This algorithm can be also used as a general top-k ranked join algorithm.

Applications in which plain text coexists with structured data are pervasive. Commercial relational database management systems (RDBMSs) generally provide querying capabilities for text attributes that incorporate state-of-the-art information retrieval (IR) relevance ranking strategies, but this search functionality requires that queries specify the exact column or columns against which a given list of keywords is to be matched. This requirement can be cumbersome and inflexible from a user perspective: good answers to a keyword query might need to be "assembled"—in perhaps unforeseen ways—by joining tuples from multiple relations. This observation has motivated recent research on free-form keyword search over RDBMSs. The present systems and techniques adapt IR-style document-relevance ranking strategies to the problem of processing free-form keyword queries over RDBMSs. The present query model can handle queries with both AND and OR semantics, and can exploit the sophisticated single-column text-search functionality often available in commercial RDBMSs. Query-processing strategies are described that build on a crucial characteristic of IR-style keyword search: only the few most relevant matches—according to some definition of "relevance"—are generally of interest. Consequently, rather than computing all matches for a keyword query, which can lead to inefficient executions, the present techniques can focus on the top-k matches for the query, for moderate values of k. A thorough experimental evaluation over real data has shown various performance advantages of the present approach.

Applications in which plain text coexists with structured data are pervasive. Furthermore, text and structured data are often stored side by side within standard relational database management systems (RDBMSs), as the following example illustrates.

Consider a customer-service database from a large vendor of computer equipment. One table in the database, Complaints(prodId, custId, date, comments), logs each complaint received as a tuple with an internal identifier of the customer who made the complaint (custId), an identifier of the main product involved in the complaint (prodId), when the complaint was made (date), and a free-text description of the problem reported by the customer (comments). An example instance of this relation is shown in following table:

TABLE 2

Example Instance of Complaints Relation

| prodId | custId | Date | Comments |
|---|---|---|---|
| p121 | c3232 | Jun. 30, 2002 | "disk crashed after just one week of moderate use on an IBM Netvista X41" |
| p131 | C3131 | Jul. 3, 2002 | "lower-end IBM Netvista caught fire, starting apparently with disk" |

The first tuple in this instance corresponds to a complaint by customer c3232 about product p121, which corresponds to a hard drive, on Jun. 30, 2002.

Commercial RDBMSs generally provide querying capabilities for text attributes that incorporate state-of-the-art information retrieval (IR) relevance ranking strategies. This search functionality typically requires that queries specify the exact column or columns against which a given list of keywords is to be matched. For example, a query:

SELECT * FROM Complaints C
WHERE CONTAINS (C.comments, 'disk crash', 1)>0
ORDER BY score(1) DESC performed on Oracle 9.1 returns the rows of the Complaints table above that match the keyword query [disk crash], sorted by their score as determined by an IR relevance-ranking algorithm. Intuitively, the score of a tuple measures how well its comments field matches the query [disk crash].

The typical requirement that queries specify the exact columns to match can be cumbersome and inflexible from a user perspective: good answers to a keyword query might need to be "assembled"—in perhaps unforeseen ways—by joining tuples from multiple relations:

Another relation in the example database can be Products (prodId, manufacturer, model). This relation records the manufacturer and model associated with each product. The prodId attribute of the Complaints relation is a foreign-key into Products. Consider the instance of relation Complaints above, plus the following instance of the Products relation:

TABLE 3

Example Instance of Products Relation

| prodId | manufacturer | model |
|---|---|---|
| p121 | "Maxtor" | "D540X" |
| p131 | "IBM" | "Netvista" |

Then the best answer for a keyword query [maxtor on ibm netvista] may be the tuple that results from joining the first tuple in both relations on the prodId attribute. This join correctly identifies that the complaint by customer c3232 is about a Maxtor disk drive (from the manufacturer attribute of the Products relation) on an IBM Netvista computer (from the comments attribute of the Complaints relation).

The present approach to free-form keyword search over RDBMSs can fully exploit single-attribute relevance-ranking results if the RDBMS of choice has text-indexing capabilities (e.g., as is the case for Oracle 9.1, available from Oracle Corporation of Redwood Shores, Calif., as discussed above). By leveraging state-of-the-art IR relevance-ranking functionality already present in modern RDBMSs, high quality results can be produced for free-form keyword queries. For example, a query [disk crash on a netvista] would still match the comments attribute of the first Complaints tuple above with a high relevance score, after word stemming (so that "crash" matches "crashed") and stop-word elimination (so that the absence of "a" is not weighed too highly). The present scheme can rely on the IR engines of RDBMSs to perform such relevance-ranking at the attribute level, and can handle both AND and OR semantics.

A detailed description of an example query model, together with a family of scoring functions to identify the top-k answers for a query are now described. Consider a database with n relations $R_1, \ldots, R_n$. Each relation $R_i$ has $m_i$ attributes $a_1^i, \ldots, a_{m_i}^i$, a primary key and possibly foreign keys into other relations. The schema graph G is a directed graph that captures the foreign key relationships in the schema. G has a node for each relation $R_i$, and an edge $R_i \rightarrow R_j$ for each primary key to foreign key relationship from $R_i$ into $R_j$. FIG. 17 shows an example schema graph 1700 for the Complaints database example, and FIGS. 18A, 18B, AND 18C show a possible instance of this database, with a Complaints relation 1810, a Products relation 1820 and a Customers relation 1830. Such schema graphs form the basis for the query-result specification now defined.

Definition of joining trees of tuples: Given a schema graph G for a database, a joining tree of tuples T is a tree of tuples where each edge $(t_i, t_j)$ in T, where $t_i \in R_i$ and $t_j \in R_j$, satisfies two properties: (1) $(R_i, R_j) \in G$, and (2) $t_i \bowtie t_j \in R_i \bowtie R_j$. The size (T) of a joining tree T is the number of tuples in T.

A top-k keyword query is a list of keywords $Q=[w_1, \ldots, w_m]$. The result for such a top-k query is a list of the k joining trees of tuples T whose Score(T,Q) score for the query is highest, where Score(T,Q) is discussed below. Score ties can be broken arbitrarily. The query result can be sorted in descending order of the scores. It can be required that any joining tree T in a query result be minimal: if a tuple t with zero score is removed from T, then the tuples remaining in T are disconnected and do not form a joining tree. In other words, T cannot have a leaf tuple with zero score. As an example, for a choice of ranking function, Score, the results for a top-3 query [Netvista Maxtor] over the example Complaints database could be (1) $c_3$; (2) $p_2 \succ c_3$; and (3) $p_1 \succ c_1$. Finally, a restriction can be imposed to not allow any tuple to appear more than once in a joining tree of tuples.

To rank joining trees of tuples for a given query, the following approach can be implemented. Traditional result ranking in keyword-search systems for relational data have included the following: given a query Q, assign a score to a joining tree of tuples T in the following way:

$$\text{Score}(T, Q) = \begin{cases} \frac{1}{size(T)} & \text{if } T \text{ contains all words in } Q \\ 0 & \text{otherwise} \end{cases}$$

Alternatively, the following scoring scheme can be used:

$$\text{Score}(T, Q) = \begin{cases} f_r(T) + f_n(T) + f_p(T) & \text{if } T \text{ contains all words in } Q \\ 0 & \text{otherwise} \end{cases}$$

where $f_r(T)$ measures how "related" the relations of the tuples of T are, $f_n(T)$ depends on the weight of the tuples of T—as determined by a PageRank-inspired technique—, and $f_p(T)$ is a function of the weight of the edges of T. Note that several variations of this scheme are also possible, such as multiplying rather than adding the tuple and edge terms above.

These approaches generally capture the size and structure of a query result in the assigned score, but do not leverage further the relevance-ranking strategies developed by the IR community over the years. These strategies can naturally help improve the quality of keyword query results over RDBMSs. Furthermore, modern RDBMSs already include IR-style relevance ranking functionality over individual text attributes, which can be exploited to define a new ranking scheme. Thus, the score assigned to a joining tree of tuples T for a query Q can rely on: (1) Single-attribute IR-style relevance scores Score($a_i$, Q) for each textual attribute $a_i \in T$ and query Q, as determined by an IR engine at the RDBMS; and (2) A Combine function, which combines the single-attribute scores into a final score for T.

As an example, a state-of-the-art IR definition for a single-attribute scoring function Score can be as follows:

$$\text{Score}(a_i, Q) = \sum_{w \in Q - a_i} \frac{1 + \ln(1 + \ln(tf))}{(1-s) + s\frac{dl}{avdl}} \cdot \ln \frac{N+1}{df} \quad (10)$$

where, for a word w, tf is the frequency of w in $a_i$, df is the number of tuples in $a_i$'s relation with word w in this attribute, dl is the size of $a_i$ in characters, avdl is the average attribute-value size, N is the total number of tuples in $a_i$'s relation, and s is a constant (e.g., 0.2). Note that this single-attribute scoring function can be readily extended to incorporate PageRank-style "link"-based scores.

Such single-attribute scores for a joining tree of tuples T can then be combined into a final score for the tree. Notice that the score for a single tuple t is defined by viewing t as a joining tree of size 1. Let A=<$a_1$, ..., $a_n$> be a vector with all textual attribute values for T. The score of T can be defined for Q as Score(T,Q)=Combine(Score(A,Q), size(T)), where Score(A, Q)=(Score($a_1$,Q), ..., Score($a_n$,Q)). Notice that instead of size(T), other characteristics of T can also be used, as suited to the specifics of the application. A simple definition for Combine is:

$$\text{Combine}(\text{Score}(A, Q), size(T)) = \frac{\sum_{a_i \in A} \text{Score}(a_i, Q)}{size(T)} \quad (11)$$

The definition for the Combine function above is a natural one, but other such functions are also possible. The query processing algorithms presented below can handle many different combining functions.

Generally, the following property should be satisfied by the combining function. Tuple monotonicity: A combining function Combine satisfies the tuple monotonicity property if for every query Q and joining trees of tuples T and T' derived from the same CN (candidate network) such that (i) T consists of tuples $t_1$, ..., $t_n$ while T' consists of tuples $t'_1$, ..., $t'_n$ and (ii) Score($t_i$, Q)≦Score($t_i'$,Q) for all i, it follows that Score(T, Q)≦Score(T', Q).

Notice that the ranking function Score(t,Q) for a single tuple can be arbitrary, although in the above discussion it is assumed that the same formula (Equation (11)) calculates the rank for both a single tuple and a joining tree of tuples. Many ranking functions for joining trees of tuples, including the one in Equation (11), satisfy the tuple-monotonicity property, and hence can be used with the execution algorithms discussed below.

In addition to the combining function, queries should specify whether they have Boolean AND or OR semantics. The AND semantics assign a score of 0 to any tuple tree that does not include all query keywords, while tuple trees with all query keywords receive the score determined by Combine. In contrast, the OR semantics assign a tuple tree its score as determined by Combine, whether the tuple tree includes all query keywords or not. In summary, the single-attribute Score function, together with the Combine function of choice, can assign relevance scores to joining trees of tuples either with AND or with OR semantics.

Figure 19:
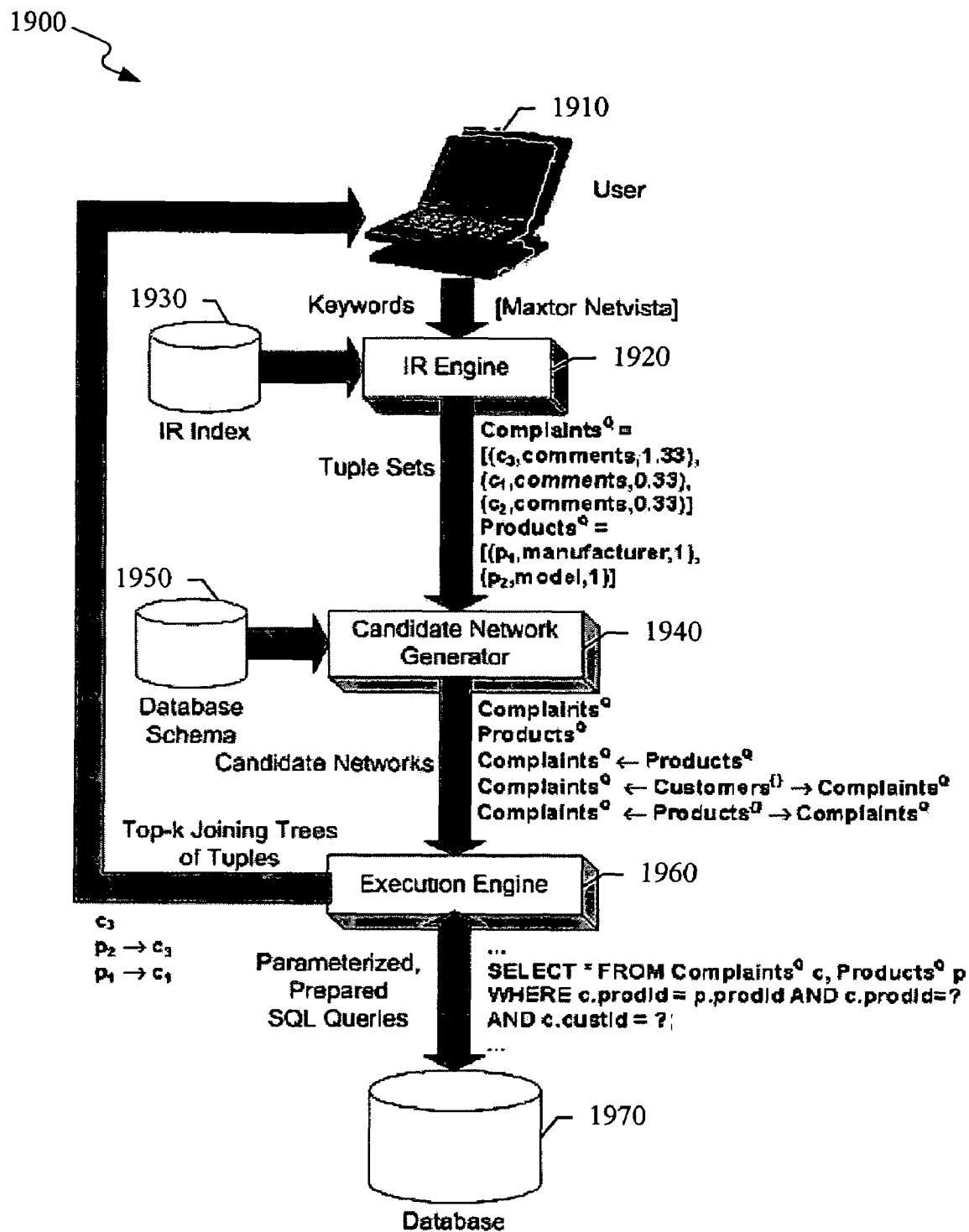
FIG. 19 shows an example architecture for an example query processing system.

FIG. 19 shows an example architecture for an example query processing system 1900. This example system can be used to efficiently identify the trees of tuples with the highest relevance scores for a given query. This architecture can rely on existing, unmodified RDBMS components.

An IR Engine module 1920 includes IR-style text indexing functionality at the attribute level. The system 1900 can exploit this functionality to identify all database tuples that have a non-zero score for a given query. The IR Engine 1920 can use an IR Index 1930 that is an inverted index that associates each keyword that appears in the database with a list of occurrences of the keyword; each occurrence of a keyword can be recorded as a tuple-attribute pair. For example, the system can use Oracle Text, which keeps a separate index for each relation attribute. Such individual indexes can be combined to build the IR Index. In addition, the system 1900 can exploit more efficient indexing schemes (e.g., text indexes at the tuple level) as RDBMSs start to support them.

When a query Q arrives from a user of a computer 1910, the IR Engine 1920 can use the IR Index to extract from each relation R the tuple set $R^Q=\{t\in R|Score(t,Q)>0\}$, which consists of the tuples of R with a non-zero score for Q. The tuples t in the tuple sets can be ranked in descending order of Score (t,Q) to support the top-k query processing described below.

A Candidate Network (CN) Generator 1940 can be the next module in the pipeline shown in FIG. 19. The CN Generator 1940 can receive as input the non-empty tuple sets from the IR Engine 1920, together with the database schema 1950 and a parameter M explained below. The key role of this module is to produce CNs, which are join expressions to be used to create joining trees of tuples that will be considered as potential answers to the query.

Specifically, a CN is a join expression that involves tuple sets plus perhaps additional "base" database relations. A base relation R that appears in a CN is referred to herein as a free tuple set and is denoted as $R^{\{\}}$. The free tuple sets in a CN do not have occurrences of the query keywords, but help connect (via foreign-key joins) the (non-free) tuple sets that do have non-zero scores for the query. Each result T of a CN is thus a potential result of the keyword query. A joining tree of tuples T can be said to belong to a CN C(T∈C) if there is a tree isomorphism mapping h from the tuples of T to the tuple sets of C. For example, in FIGS. 18A, 18B, AND 18C, $(c_1 \leftarrow p_1)\in$ (Complaints$^Q \leftarrow$Products$^Q$). The input parameter M can bound the size (in number of tuple sets, free or non-free) of the CNs that the module 1940 produces.

One approach to the notion of CN can involve a requirement that each joining tree of tuples in the query answer contain all query keywords. To produce all answers for a query with this AND semantics, multiple tuple sets are created for each database relation. Specifically, a separate tuple set is created for each combination of keywords in Q and each relation. This generally leads to a number of CNs that is exponential in the query size, which can make query execution prohibitively expensive for queries of more than a very small number of keywords or for values of M greater than 4 or so.

Alternatively, the present systems and techniques need only create a single tuple set $R^Q$ for each relation R, as specified above. For queries with AND semantics, a post processing step can check that only tuple trees containing all query keywords are returned. This characteristic of the present systems and techniques can result in significantly faster executions, which in turn can enable the handling of larger queries and also the consideration of larger CNs.

The process of CN generation generally involves first creating the tuple set graph from the database schema graph and the tuple sets returned by the IR Engine module. FIG. 20 shows the tuple set graph for the Complaints database and query Q=[Maxtor Netvista]. Initially, the set S of candidate CNs can consist of the non-free tuple sets (Products$^Q$ and Complaints$^Q$ in this example). Each CN s∈S can be progressively expanded by adding a tuple set adjacent to s in the tuple set graph. Note that s can be considered a CN and hence part of the output of this module if it satisfies the following properties:

1. The number of non-free tuple sets in s does not exceed the number of query keywords m: This constraint guarantees that a minimum number of CNs are generated while not missing any result that contains all the keywords, which can be crucial for Boolean-AND semantics. That is, for every result T that contains every keyword exactly once, a CN C exists such that T∈C. For example, Products$^Q$>Complaints$^Q$<Customers$^{\{\}}$>Complaints$^Q$ is not a CN of query [Maxtor Netvista]. Its results are a subset of the results of Products$^Q$>Complaints$^{\{\}}$<Customers$^{\{\}}$>Complaints$^Q$.

2. No leaf tuple sets of s are free: This constraint can ensure CN minimality. For example, Products$^Q$>Complaints$^{\{\}}$ is not a CN because it is subsumed by the simpler CN Products$^Q$.

3. s does not contain a construct of the form R>S<R: If such a construct existed, every resulting joining tree of tuples might contain the same tuple more than once. For example, Products$^Q$>Complaints$^{\{\}}$<Products$^Q$ is not a CN because all produced joining networks of tuples would be of the form p>c<p' with p≡p'.

The size of a CN can be its number of tuple sets. All CNs of size 3 or lower for the query [Maxtor Netvista] are shown in FIG. 17.

An Execution Engine module 1960 in the pipeline of FIG. 17 receives as input a set of CNs together with the non-free tuple sets. The Execution Engine 1960 can contact the RDBMS's query execution engine repeatedly to identify the top-k query results in a database 1970. FIG. 21 shows the joining trees of tuples produced by each CN 2100, together with their scores for the query [Maxtor Netvista] over our Complaints example.

The Execution Engine module 1960 can employ various algorithms to effect efficient operation. Algorithms for a core operation in the system 1900 can be defined as follows: given a set of CNs together with a set of non-free tuple sets, the Execution Engine 1960 should efficiently identify the top-k joining trees of tuples that can be derived.

In some implementations, the Execution Engine 1960 issues a SQL (Structured Query Language) query for each CN for a top-k query. The results from each CN can be combined in a sort-merge manner to identify the final top-k results of the query. This approach can also involve only getting the top-k results from each CN according to the scoring function, and a top-k "hint" functionality (e.g., that available in the Oracle 9.1 RDBMS) can be enabled. In the case of Boolean-AND semantics, an additional filtering operation can be performed on the stream of results to check for the presence of all keywords.

An improvement to this approach can be realized by dynamically pruning some CNs during query evaluation. By discarding at any point in time any (unprocessed) CN that is guaranteed not to produce a top-k match for the query, query-processing performance can be improved. For example, a bound $MPS_i$ on the maximum possible score of a tuple tree derived from a CN $C_i$ can be computed. If $MPS_i$ does not exceed the actual score of k already produced tuple trees, then CN $C_i$ can be safely removed from further consideration. To calculate $MPS_i$, the combining function can be applied to the top tuples (due to the monotonicity property discussed above) of the non-free tuple sets of $C_i$. That is, $MPS_i$ is the score of a hypothetical joining tree of tuples T that contains the top tuples from every non-free tuple set in $C_i$. As a further optimization, the CNs for a query can be evaluated in ascending size order. This way, the smallest CNs, which are the least expensive to process and are the most likely to produce high-score tuple trees using the combining function above, are evaluated first. These optimizations (referred to as the Sparse algorithm) can result in significant advantages for queries that produce relatively few results.

FIG. 23 shows pseudo code 2300 for a single pipelined approach to calculating the top-k results for a single CN in a pipelined fashion. The Single Pipelined algorithm receives as input a candidate network C and the non-free tuple sets $TS_1, \ldots, TS_v$ that participate in C. Recall that each of these non-free tuple sets corresponds to one relation, and contains the tuples in the relation with a non-zero match for the query.

Furthermore, the tuples in $TS_i$ can be sorted in descending order of their Score for the query. Note that the attribute Score($a_i$,Q) and tuple Score(t,Q) scores associated with each tuple t∈$TS_i$ can be initially computed by the IR Engine 1920, and need not need be re-calculated by the Execution Engine 1960. The output of the Single Pipelined Algorithm can be a stream of joining trees of tuples T in descending Score(T,Q) order.

The Single Pipelined algorithm can keep track of the prefix S($TS_i$) retrieved from every tuple set $TS_i$; in each iteration of the algorithm, a new tuple t can be retrieved from one $TS_M$, after which this can be added to the associated retrieved prefix S($TS_M$). (The choice of $TS_M$ is discussed below.) Then, each potential joining tree of tuples T in which t can participate can be identified. For this, a parameterized query that performs appropriate joins involving the retrieved prefixes can be prepared in advance. FIG. 17 shows the parameterized query for the CN $C^Q<P^Q$. Such parameterized query can be invoked once for every tuple ($t_i$, ..., $t_{M-1}$, t, $t_{M+1}$, ..., $t_v$), where $t_i \in S(TS_i)$ for i=1, ..., v and i≠M. All joining trees of tuples that include t can be returned by these queries, and can be added to a queue R. These trees can be outputted once it is established that they are one of the top-k joining trees for the original query. However, output can begin without first having to compute and rank-order all candidate trees, because the score that tuple trees not yet produced can achieve can be bounded.

In effect, the Single Pipelined algorithm can start producing results before examining the entire tuple sets. For this, an effective estimate of the Maximum Possible Future Score (MPFS) that any unseen result can achieve, given the information already gathered by the algorithm, can be maintained. Notice that MPS, as defined above, is equivalent to MPFS before the evaluation of the CN begins (i.e., before any parameterized query is executed).

The status of each prefix S($TS_i$) can be analyzed to bound the maximum score that an unretrieved tuple from the corresponding non-free tuple set can reach. Non-free tuple sets here are ordered by their tuple scores. To compute MPFS, $MPFS_i$ is calculated for each non-free tuple set $TS_i$ as the maximum possible future score of any tuple tree that contains a tuple from $TS_i$ that has not yet been retrieved (i.e., that is not in S($TS_i$)):

$MPFS_i$=max{Score (T, Q)|T∈$TS_a$⋈ ... ⋈($TS_i$–S($TS_i$))⋈ ... ⋈$TS_v$}

Unfortunately, a precise calculation of $MPFS_i$ would involve multiple database queries, with cost similar to that of computing all possible tuple trees for the queries. As an alternative to this expensive computation, a tight overestimate $\overline{MPFS_i}$ can be computed as the score of the hypothetical tree of tuples consisting of the next unprocessed tuple $t_i$ from $TS_i$ and the top-ranked tuple $t_j^{top}$ of each tuple set $TS_j$, for j≠i. Notice that $\overline{MPFS_i}$ is an overestimate of $MPFS_i$ because there is no guarantee that the tuples t and $t_j^{top}$ will indeed participate in a joining tree of C. However, $\overline{MPFS_i}$ is a good estimate that can be produced efficiently without accessing the database and can result in significant savings over alternative executions. Following a similar rationale, an overestimate $\overline{MPFS}$ for the entire candidate network C can also be defined, as $\overline{MPFS}$=max$_{i=1, ..., v}$ $\overline{MPFS_i}$. A tentative result from R (see FIG. 23) can be safely returned as one of the top-k results if its associated score is no less than MPFS.

Another issue is the choice of the tuple set from which to pick the next tuple t. One simple possibility is to pick tuple sets randomly, or in a round-robin way. Instead, the Single Pipelined algorithm picks the most promising tuple set, which is defined as the tuple set that can produce the highest ranked result. Using this heuristic, the next tuple from the tuple set $TS_M$ with the maximum value of $\overline{MPFS_i}$ can be picked (i.e., $\overline{MPFS_M}$=max$_i\overline{MPFS_i}$). This choice of tuple set can result in better performance over random or round-robin choices.

As an example, FIG. 22 shows a snapshot 2200 of an execution of a single pipelined process on a hypothetical database. The candidate network C has three free and three non-free tuple sets. The thick dashed lines denote the prefix of each tuple set retrieved so far. The combining function of Equation (11) can be used. The first result of R is output because its score is equal to $\overline{MPFS}$. In contrast, the second result cannot yet be safely output because its score is below $\overline{MPFS}$. Suppose that a new tuple $c_2$ is now retrieved from the tuple set with maximum $\overline{MPFS_i}$. Further, assume that no results are produced by the associated parameterized queries when instantiated with $c_2$. Then, $$\overline{MPFS_3} = \frac{2+7+9}{6} = 3$$

and $\overline{MPFS}$=3. Thus, now the second result of R can be output.

The correctness of this algorithm generally relies on the combining function satisfying the tuple monotonicity property discussed above. Moreover, additional processing is used for queries with AND semantics: Before issuing a parameterized query, check if all query keywords are contained in the tuples that are passed as parameters. This single pipelined approach can in turn be used as a building block of the global pipelined algorithm described next.

FIG. 24 shows pseudo code 2400 for a global pipelined approach to calculating the top-k results in a pipelined fashion. The Global Pipelined algorithm generalizes the Single Pipelined algorithm to multiple CNs and can be used to calculate the final result for top-k queries. The Global Pipelined algorithm builds on the Single Pipelined algorithm to efficiently answer a top-k keyword query over multiple CNs. The algorithm receives as input a set of candidate networks, together with their associated non-free tuple sets, and produces as output a stream of joining trees of tuples ranked by their overall score for the query.

All CNs of the keyword query can be evaluated concurrently following an adaptation of a priority preemptive, round robin protocol (such as described in A. Burns; Preemptive priority based scheduling: An appropriate engineering approach; In Advances in Real Time Systems, pages 225-248; S. H. Son, Prentice Hall, 1994), where the execution of each CN corresponds to a process. Each CN can be evaluated using a modification of the Single Pipelined algorithm, with the priority of a process being the $\overline{MPFS}$ value of its associated CN.

Initially, a minimal portion of the most promising CN $C_c$ (i.e., $C_c$ has the highest $\overline{MPFS}$ value) can be evaluated. This minimal portion can correspond to processing the next tuple from $C_c$ (lines 12-17 in pseudo code 2400). After this, the priority of $C_c$ (i.e., $\overline{MPFS_c}$) can be updated, and the CN with the next highest $\overline{MPFS}$ value can be picked. A tuple-tree result can be output (line 18 in pseudo code 2400) if its score is no lower than the current value of the Global $\overline{MPFS}$, GMPFS, defined as the maximum $\overline{MPFS}$ among all the CNs for the query. Note that if the same tuple set TS is in two different CNs, it is processed as two separate (but identical) tuple sets. In practice, this can be implemented by maintaining two open cursors for TS.

Figures 25, 26:
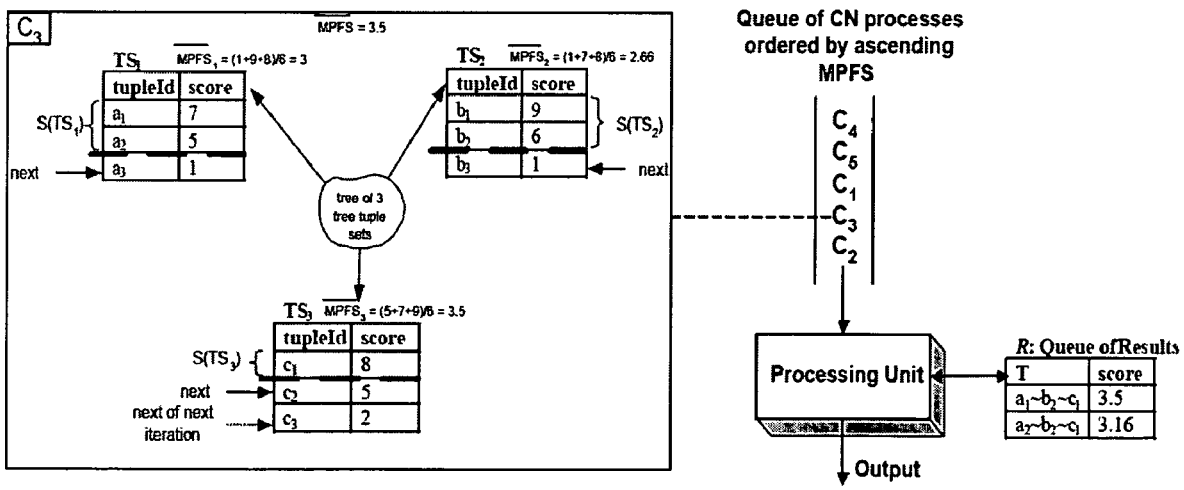
FIG. 25 shows pseudo code for a hybrid approach, which combines Global Pipelined and Sparse algorithms.
FIG. 26 shows a snapshot of a global pipelined evaluation of a query with five candidate networks on a hypothetical database.

FIG. 26 shows a snapshot 2600 of the global pipelined evaluation of a query with five CNs on a hypothetical database. At each point, the CN with the maximum $\overline{MPFS}$ is processed, and a global queue of potential results is maintained. After a minimal portion of the current CN C is evaluated, its $\overline{MPFS}$ is updated, which redefines the priority of C.

As another example, consider the query [Maxtor Netvista] on example database described previously. All CNs of size up to 2 can be considered, namely $C_1$: Complaints$^Q$; $C_2$: Products$^Q$; and $C_3$: Complaints$^Q$<Products$^Q$. These CNs do not include free tuple sets because of the restriction that CN cannot include, free leaf tuple sets. The minimum size of a CN with free tuple sets in this case is three. The following triple sets are associated with the three CNs:

| $C_1$: $TS_{1,1}$ | | $C_2$: $TS_{2,1}$ | |
|---|---|---|---|
| tupleID | Score (t, Q) | tupleID | Score (t, Q) |
| $c_3$ | 1.33 | $p_1$ | 1 |
| $c_2$ | 0.33 | $p_2$ | 1 |
| $c_1$ | 0.33 | | |

| $C_3$: $TS_{3,1}$ | | $C_3$: $TS_{3,2}$ | |
|---|---|---|---|
| tupleID | Score (t, Q) | tupleID | Score (t, Q) |
| $c_3$ | 1.33 | $p_1$ | 1 |
| $c_2$ | 0.33 | $p_2$ | 1 |
| $c_1$ | 0.33 | | |

Following the pseudo code 2400, the top tuple from each CN's tuple set is obtained and the database is queried for results containing these tuples (lines 5-9). The result-tuples $c_3$ and $p_1$ are extracted (line 10) from $C_1$ and $C_2$ respectively. No results are produced from $C_3$ since $c_3$ and $p_1$ do not join. The $\overline{MPFS}$s of $C_1$, $C_2$, and $C_3$ are 0.33, 1, and 1.17 (=(1.33+1)/2), respectively. Hence GMPFS=1.17, and $c_3$ is output since it has score 1.33>GMPFS. On the other hand, $p_1$ is not output because its score is 1, which is less than GMPFS. Next, a new tuple is obtained for the most promising CN, which is now $C_3$. The most promising triple set for $C_3$ is $TS_{3,2}$. Therefore, $p_2$ is retrieved and the results of the parameterized query $q_3$ ($c_3$, $p_2$) (which is $c_3$<$p_2$) are added to R. Notice that $q_3$ is the query SELECT * FROM $TS_{3,1}$, $TS_{3,2}$, Complaints c, Products p WHERE $TS_{3,1}$.tupleId=? AND $TS_{3,2}$.tupleId=? AND $TS_{3,1}$.tupleId=c.tupleId AND $TS_{3,2}$.tupleId=p.tupleId AND c.prodId=p.prodId. Now, the $\overline{MPFS}$ bounds of $C_1$, $C_2$, and $C_3$ are 0.33, 1, and 0.67 (=(0.33+1)/2), respectively. Hence GMPFS=1; $c_3$<$p_2$ is output because it has score 1.165, which is greater than or equal to GMPFS. Also, $p_1$ is output because it has score 1, which is greater than or equal to GMPFS.

Just as for the single pipelined approach, the correctness of the global pipelined approach generally relies on the combining function satisfying the tuple-monotonicity property discussed above. Moreover, the global pipelined approach can be very efficient for queries that produce many results.

FIG. 25 shows pseudo code 2500 for a hybrid approach, which combines the Global Pipelined and the Sparse algorithms described above. As mentioned briefly above, the Sparse algorithm is very efficient for queries with relatively few results, while Global Pipelined performs well for queries with a relatively large number of results. Hence, a hybrid of these two, which that estimates the expected number of results for a query and chooses an appropriate algorithm to process the query accordingly, can result in a highly efficient system.

The efficiency of the Hybrid algorithm shown in FIG. 25 relies heavily on the accuracy of the result-size estimator. For queries with OR semantics, the RDBMS's result-size estimates can be used. For queries with AND semantics, the result-size estimates provided by the RDBMS (e.g., Oracle 9i) may not be ideal. Therefore, an estimate S of the number of tuples derived from a CN (i.e., the number of tuples that match the associated join conditions) can be obtain from the RDBMS, but this estimate should then be adjusted so that only tuple trees that contain all query keywords are considered. To illustrate this adjustment, consider a two-keyword query [$w_1$,$w_2$] with two non-free tuple sets $TS_1$ and $TS_2$. If the two keywords are assumed to appear independently of each other in the tuples, the estimate S can be adjusted by multiplying by $$\frac{|TS_1^{w_1}| \cdot |TS_2^{w_1}| + |TS_1^{w_2}| \cdot |TS_2^{w_1}|}{|TS_1| \cdot |TS_2|}$$

where $TS_i^w$ is the subset of $TS_i$ that contains keyword w. An implicit simplifying assumption in the computation of this adjustment factor is that no two keywords appear in the same tuple. Alternative approaches to defining a hybrid algorithm are also possible. For example, the number of results for each CN C can be estimated, and a decision made as to whether to execute the Single Pipeline algorithm over C or submit the SQL query of C to the DBMS.

Thus, the present systems and techniques describe efficient IR-style keyword search over relational databases. A query in this model is a list of keywords, and does not need to specify any relation or attribute names. The answer to such a query is a rank of tuple trees, which potentially include tuples from multiple relations that are combined via joins. To rank tuple trees, a ranking function is introduced that leverages and extends the ability of modern relational database systems to provide keyword search on individual text attributes and rank tuples accordingly. This ranking function can appropriately combine the RDBMS-provided scores of individual attributes and tuples. Several top-k query-processing algorithms are introduced whose relative strengths depend, for example, on whether queries have Boolean-AND or OR semantics. A hybrid algorithm is also described that decides at run-time the best strategy to follow for a given query, based on result-size estimates for the query. This hybrid algorithm may have the best overall performance for both AND and OR query semantics when evaluated over real data.

Different from other search methods, the present systems and techniques can implement a more elaborate ranking framework without algorithms for retrieving all the results in producing the top results and without ignoring the schema information. In applications, described systems and techniques may be used to answer keyword queries in structured or semistructured databases. Various other keyword search systems either rank according to the text of a document but ignore its structure, or rank the results solely according to their structure. The approach described herein can combine the beneficial features of both types of search systems and provide higher-quality results without sacrificing real-time response times. As an example, the present approach may be integrated in a database system suite to allow keyword search in addition to the traditional SQL searching. Also, the present approach may be offered as an add-on to a database system to be purchased by enterprises. Furthermore, the present search method may be implemented as a middleware and thus allows it to be set-up on top of an already operational database application.

Only a few implementations are described. However, it is understood that variations and enhancements may be made. For example, not all of the adjusting parameters 112 from FIG. 1 need be input during a preprocessing stage. Various opportunities exist for moving some of these parameters 112 to a query stage, that is, to perform on-demand Object Rank calculation instead of storing an Object Rank index. This would allow the user to input more parameters to calibrate his/her query.

The processes described above, and all of the functional operations described in this specification, can be implemented in electronic circuitry, or in computer hardware, firmware, software, or in combinations of them, such as the structural means disclosed in this specification and structural equivalents thereof, including potentially a program (stored in a machine-readable medium) operable to cause one or more programmable machines including processor(s) (e.g., a computer) to perform the operations described. It will be appreciated that the order of operations presented is shown only for the purpose of clarity in this description. No particular order may be required for these operations to achieve desirable results, and various operations can occur simultaneously.

Other embodiments may be within the scope of the following claims.

What is claimed is:

1. A machine-implemented method comprising:
analyzing digital information viewed as a labeled graph, including nodes and edges, based on a flow of authority among the nodes along the edges, the flow of authority being derived at least in part from different authority transfer rates assigned to the edges based on edge type schema information; and
generating a keyword-specific ranking of the nodes in response to a query, including at least one keyword, based on a result of the analyzing;
wherein the keyword-specific ranking is generated in memory by one or more computers configured to process keyword queries of the digital information comprising words;
the method further comprising:
receiving the query, the query including multiple keywords;
wherein the analyzing the digital information comprises generating multiple initial rankings corresponding to the multiple keywords, each of the multiple initial rankings indicating authority of the nodes with respect to each respective keyword; and
wherein the generating the keyword-specific ranking comprises combining the multiple initial rankings;
wherein the generating the multiple initial rankings comprises topologically sorting the labeled graph, and wherein the generating the multiple initial rankings comprises
identifying and removing cycles in the labeled graph to reduce the labeled graph into a directed acyclic graph (DAG) and a set of backward edges before doing keyword-specific calculation of the multiple initial rankings;
identifying a set of backnodes, which are nodes of the labeled graph from which the backward edges start; and
calculating node rank information in a bifurcated fashion such that calculation of the node rank information is split between (1) calculating DAG node rank information while ignoring the backward edges and (2) calculating backedges node rank information, due to the backward edges, using the identified backnodes.

2. A system comprising:
one or more processors; and
a machine-readable medium storing a program operable to cause the one or more processors to perform operations, the program comprising;
an object rank module configured to generate multiple initial rankings corresponding to multiple query keywords, each of the multiple initial rankings indicating authority of nodes in a graph with respect to each respective query keyword individually; and
a query module configured to combine the multiple initial rankings in response to a query;
wherein the object rank module is configured to generate the multiple initial rankings based on an analysis of a flow of authority among the nodes along edges in the graph, the flow of authority being derived at least in part from different authority transfer rates assigned to the edges based on edge type schema information of the graph;
wherein the object rank module is configured to topologically sort the graph, and wherein the object rank module is configured to:
identify and remove cycles in the graph to reduce the graph into a directed acyclic graph (DAG) and a set of backward edges before doing keyword-specific calculation of the multiple initial rankings;
identify a set of backnodes; and
calculate node rank information in a bifurcated fashion such that calculation of the node rank information is split between (1) calculating DAG node rank information while ignoring the backward edges and (2) calculating backedges node rank information, due to the backward edges, using the identified backnodes.

3. A program stored in a machine-readable medium and operable to cause one or more machines to perform operations comprising:
analyzing digital information viewed as a labeled graph, including nodes and edges, based on a flow of authority among the nodes along the edges, the flow of authority being derived in accordance with one or more factors including different authority transfer rates assigned to the edges based on edge type schema information; and
generating a keyword-specific ranking of the nodes in response to a query, including at least one keyword, based on a result of the analyzing;
the operations further comprising:
receiving the query, the query including multiple keywords;
wherein the analyzing the digital information comprises generating multiple initial rankings corresponding to the multiple keywords, each of the multiple initial rankings indicating authority of the nodes with respect to each respective keyword; and
wherein the generating the keyword-specific ranking comprises combining the multiple initial rankings;
wherein the generating the multiple initial rankings comprises topologically sorting the labeled graph, and wherein the generating the multiple initial rankings comprises
identifying and removing cycles in the labeled graph to reduce the labeled graph into a directed acyclic graph (DAG) and a set of backward edges before doing keyword-specific calculation of the multiple initial rankings;

identifying a set of backnodes, which are nodes of the labeled graph from which the backward edges start; and
calculating node rank information in a bifurcated fashion such that calculation of the node rank information is split between (1) calculating DAG node rank information while ignoring the backward edges and (2) calculating backedges node rank information, due to the backward edges, using the identified backnodes.

* * * * *